United States Patent
Simpson

(10) Patent No.: US 9,912,743 B2
(45) Date of Patent: Mar. 6, 2018

(54) REAL-TIME COLLECTION AND DISTRIBUTION OF INFORMATION FOR AN EVENT ORGANIZED ACCORDING TO SUB-EVENTS

(71) Applicant: Keith Simpson, Shreveport, LA (US)

(72) Inventor: Keith Simpson, Shreveport, LA (US)

(73) Assignee: SKYCAPITAL INVESTORS, LLC, Shreveport, LA (US)

( * ) Notice: Subject to any disclaimer, the term of this patent is extended or adjusted under 35 U.S.C. 154(b) by 443 days.

(21) Appl. No.: 14/194,459

(22) Filed: Feb. 28, 2014

(65) Prior Publication Data

US 2015/0248194 A1   Sep. 3, 2015

(51) Int. Cl.
| | |
|---|---|
| *H04N 21/218* | (2011.01) |
| *H04L 29/08* | (2006.01) |
| *H04L 29/06* | (2006.01) |
| *G06K 9/00* | (2006.01) |

(52) U.S. Cl.
CPC ........ *H04L 67/104* (2013.01); *H04L 67/1097* (2013.01); *G06K 9/00718* (2013.01); *H04L 65/60* (2013.01); *H04N 21/21805* (2013.01)

(58) Field of Classification Search
CPC .............. G06F 3/0482; G06F 3/04842; G06F 3/04847; G06F 17/30578; H04L 67/1097; H04L 67/104; H04L 65/60; H04N 21/21805; G06K 9/00718

See application file for complete search history.

(56) References Cited

U.S. PATENT DOCUMENTS

| | | | |
|---|---|---|---|
| 6,795,638 B1 * | 9/2004 | Skelley, Jr. .......... | G11B 27/002 386/200 |
| 6,833,863 B1 * | 12/2004 | Clemens .............. | H04N 1/2112 348/211.1 |
| 7,046,273 B2 | 5/2006 | Suzuki | |
| 7,211,000 B2 | 5/2007 | Jutzi et al. | |

(Continued)

FOREIGN PATENT DOCUMENTS

| | | |
|---|---|---|
| GB | 2484264 A | 4/2012 |
| WO | WO 2011/066408 A1 | 6/2011 |

(Continued)

*Primary Examiner* — Shen Shiau
(74) *Attorney, Agent, or Firm* — Birch, Stewart, Kolasch & Birch, LLP

(57) ABSTRACT

The invention is directed to a system and method of asynchronously collecting different types of information for an event (e.g., football game) and aggregating the information in real-time according to sub-events (e.g., plays from scrimmage). One or more terminals (e.g., smartphones, tablet or laptop computers) are configured to capture information (video, still images, metadata) of each sub-event and distribute the captured information to the other terminals in real-time. Such distribution may be facilitated using a cloud network and server, or else a peer-to-peer (P2P) network. Further, one of the terminals is configured to notify the other terminals when a particular sub-event has commenced, thus allowing the captured information of the particular sub-event to be associated with a corresponding sub-event identifier. The captured information may be aggregated according to the sub-events by use of sub-event identifiers for presentation to users, e.g., in a playlist.

19 Claims, 14 Drawing Sheets

(56) References Cited

U.S. PATENT DOCUMENTS

| | | | |
|---|---|---|---|
| 7,975,062 B2* | 7/2011 | Krikorian | G11B 27/034 |
| | | | 709/231 |
| 8,355,083 B2 | 1/2013 | Keiser et al. | |
| 8,400,436 B1* | 3/2013 | Kuck | H04H 60/06 |
| | | | 345/204 |
| 8,527,340 B2 | 9/2013 | Fisher et al. | |
| 8,601,089 B2 | 12/2013 | Bowman et al. | |
| 8,602,887 B2 | 12/2013 | Tardif et al. | |
| 8,606,872 B1* | 12/2013 | Reitnour | G06F 15/17306 |
| | | | 709/203 |
| 8,610,786 B2 | 12/2013 | Ortiz | |
| 8,761,523 B2* | 6/2014 | Cok | G06K 9/00677 |
| | | | 382/224 |
| 8,855,471 B2* | 10/2014 | Stone | G06F 17/30017 |
| | | | 386/278 |
| 9,110,988 B1* | 8/2015 | Tan | G06F 17/30784 |
| 9,356,792 B1* | 5/2016 | Nace | H04L 12/1813 |
| 2002/0119823 A1 | 8/2002 | Beuscher | |
| 2005/0005308 A1* | 1/2005 | Logan | G06Q 30/06 |
| | | | 725/135 |
| 2008/0060001 A1* | 3/2008 | Logan | G06Q 30/06 |
| | | | 725/34 |
| 2008/0092181 A1* | 4/2008 | Britt | H04N 7/1675 |
| | | | 725/87 |
| 2008/0127272 A1 | 5/2008 | Cragun et al. | |
| 2009/0189982 A1 | 7/2009 | Tawiah | |
| 2010/0123830 A1* | 5/2010 | Vunic | G06K 9/00711 |
| | | | 348/700 |
| 2010/0274816 A1* | 10/2010 | Guzik | G11B 27/034 |
| | | | 707/802 |
| 2011/0018998 A1* | 1/2011 | Guzik | H04N 21/21 |
| | | | 348/143 |
| 2011/0173235 A1* | 7/2011 | Aman | A63B 24/0021 |
| | | | 707/792 |
| 2011/0271213 A1* | 11/2011 | Newman | H04L 12/1822 |
| | | | 715/758 |
| 2012/0057852 A1 | 3/2012 | Devleeschouwer et al. | |
| 2012/0081531 A1 | 4/2012 | DeAngelis et al. | |
| 2012/0233000 A1* | 9/2012 | Fisher | G06Q 30/02 |
| | | | 705/14.71 |
| 2013/0117692 A1* | 5/2013 | Padmanabhan | H04N 21/4126 |
| | | | 715/753 |
| 2013/0128038 A1* | 5/2013 | Cok | H04N 7/002 |
| | | | 348/143 |
| 2013/0150988 A1* | 6/2013 | Kuck | H04H 60/06 |
| | | | 700/91 |
| 2013/0216993 A1 | 8/2013 | Acree | |
| 2013/0222601 A1 | 8/2013 | Engström et al. | |
| 2013/0287317 A1 | 10/2013 | Panabaker et al. | |
| 2013/0300821 A1 | 11/2013 | Lankford et al. | |
| 2015/0262616 A1* | 9/2015 | Jaime | G11B 27/034 |
| | | | 386/228 |
| 2015/0331942 A1* | 11/2015 | Tan | G06F 17/30784 |
| | | | 386/241 |
| 2016/0247537 A1* | 8/2016 | Ricciardi | G11B 27/036 |
| 2017/0025152 A1* | 1/2017 | Jaime | G11B 27/031 |
| 2017/0178688 A1* | 6/2017 | Ricciardi | G11B 27/036 |

FOREIGN PATENT DOCUMENTS

| | | |
|---|---|---|
| WO | WO 2012/027799 A1 | 3/2012 |
| WO | WO 2013/024490 A2 | 2/2013 |
| WO | WO 2013/124856 A1 | 8/2013 |
| WO | WO 2013/185238 A1 | 12/2013 |

* cited by examiner

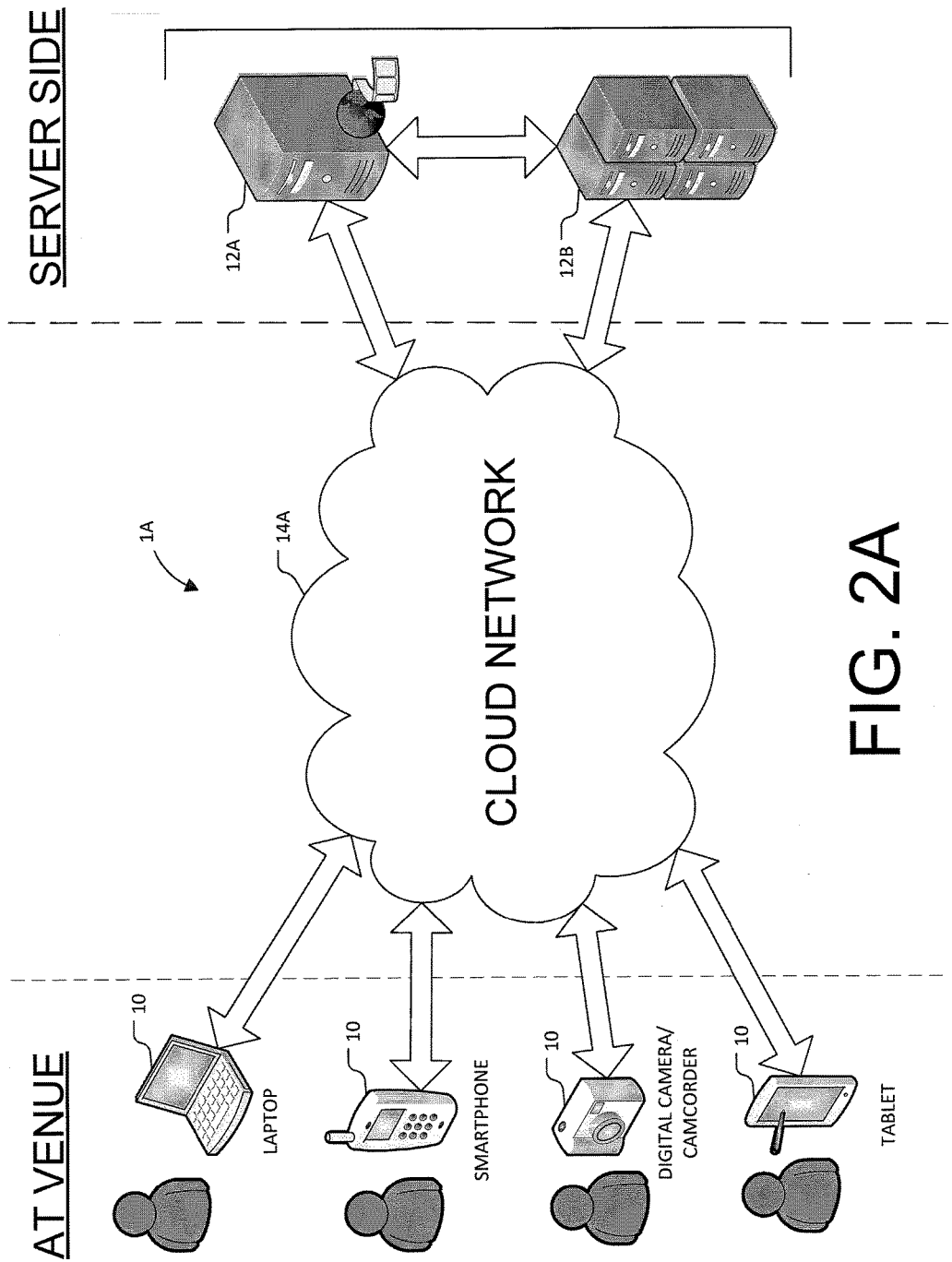

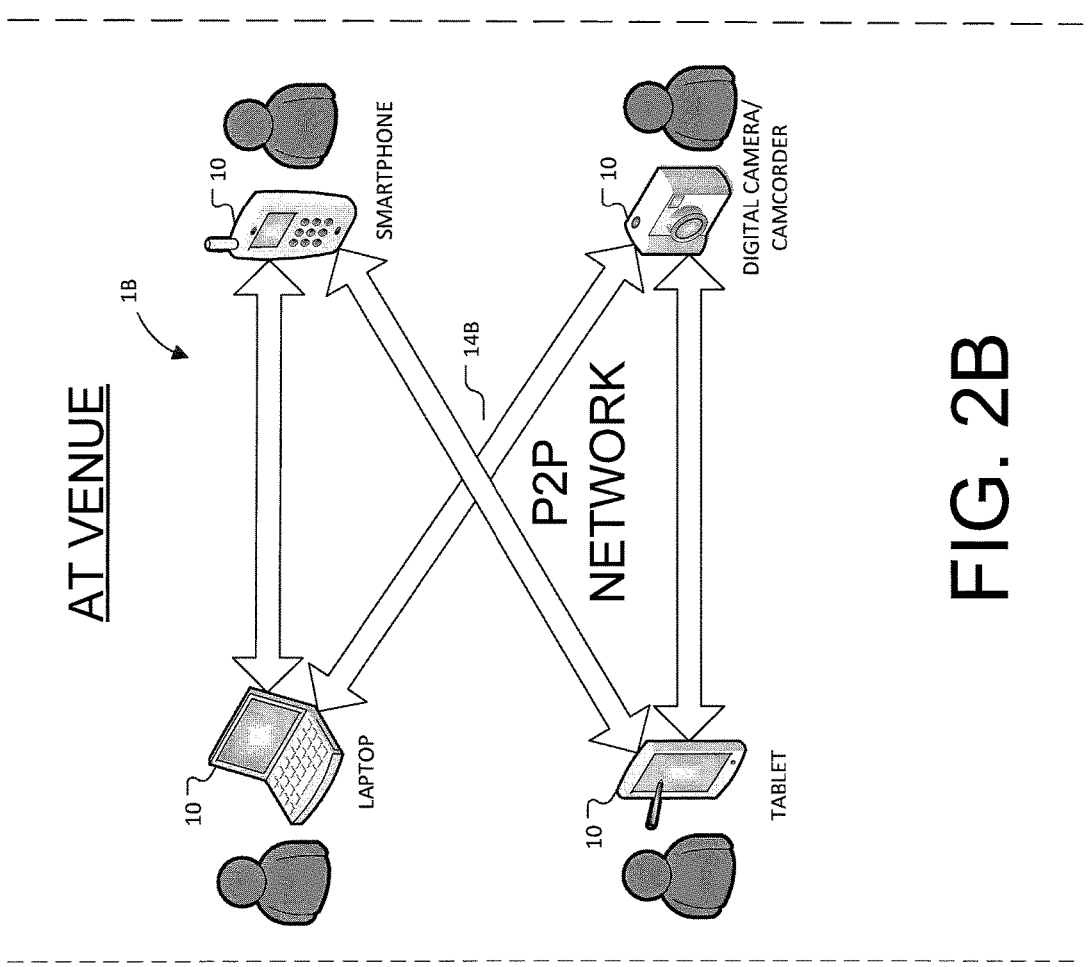

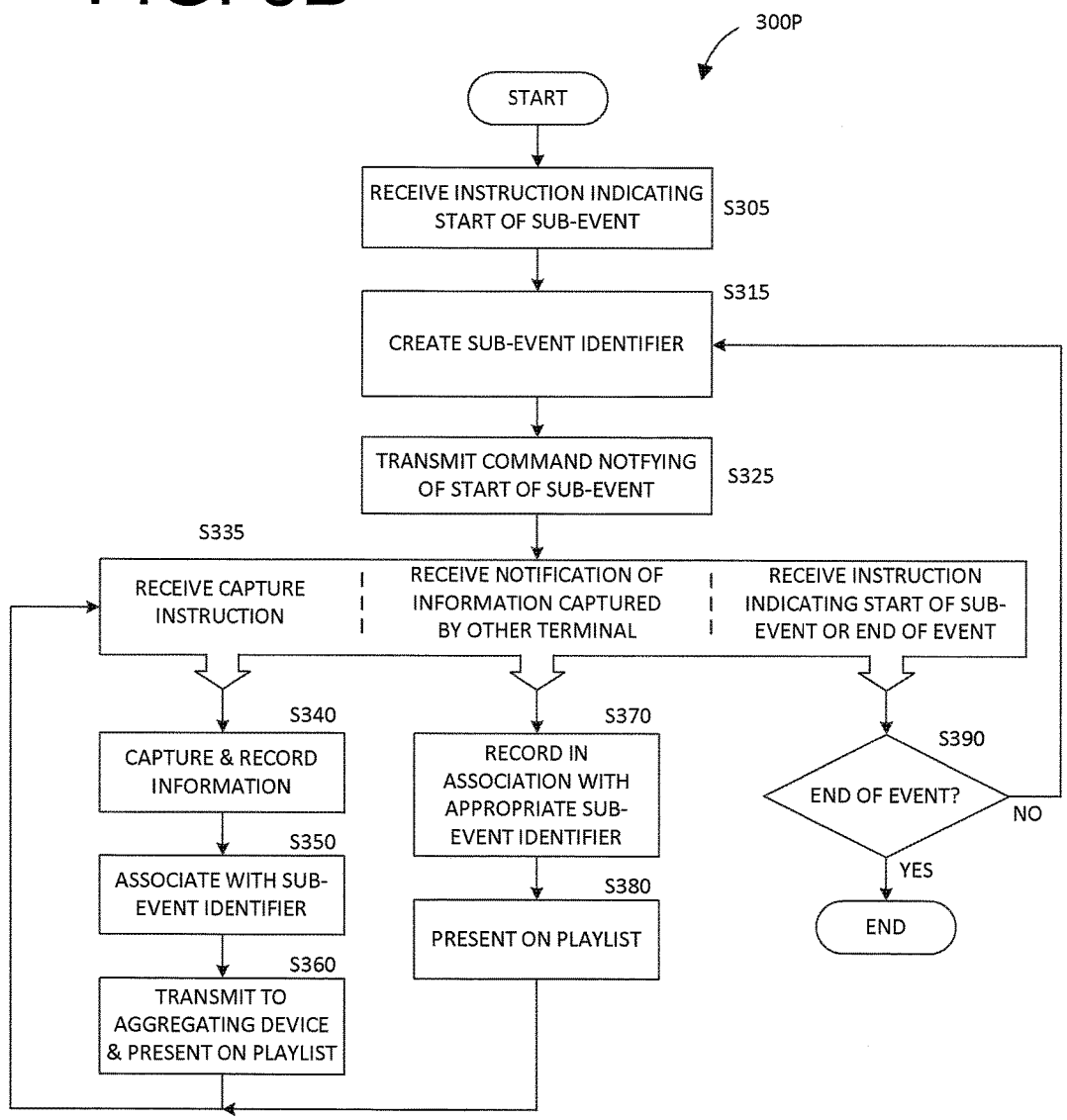

REAL-TIME COLLECTION AND DISTRIBUTION OF INFORMATION FOR AN EVENT ORGANIZED ACCORDING TO SUB-EVENTS

FIELD OF THE INVENTION

The present invention is directed to a system and method for asynchronously collecting media data and metadata of a sub-event (e.g., sports play) in real-time so that the collected data can be consolidated in a playlist for an event (e.g., sports contest) for review upon conclusion of the sub-event.

BACKGROUND OF THE INVENTION

Existing systems allow for individuals to capture a series of videos during a sports event (e.g., football game), and aggregate this information with metadata identifying the particular plays during which the videos were taken and other information such as game statistics. Such systems have the capability of collecting these videos and other types of data from multiple sources. However, the collection of this information must follow a particular sequence, and thus the aggregation of such information cannot be performed in real-time.

A specific example of the aforementioned systems is as follows. In a system, a user can record video of a play locally at the stadium or sports venue and, once recording of the play is completed, upload the video to a server to make it available online. Once the video is online, the system allows someone else to add information about the corresponding play. Such system also has the capability to allow another user to record stats about the play locally and, after manual verification, execute an online process to merge the stats with the video.

However, existing systems such as the one described above wait until after a given play has taken place before merging the video(s) and other data associated with that play. Accordingly, existing systems are not efficient enough to allow users (e.g., coaches) to review the aggregated information about a play from multiple sources before the next play commences. Instead, the coaches must wait for a break in the game (e.g., timeout or half-time) before they are able to review the aggregated information of previous plays.

It would be advantageous to provide a system in which different types of information (e.g., videos, audio data, still images, and/or metadata) captured for a particular event (e.g., a football game, a play, or a concert) are collected and aggregated in real-time, in a format that is easily consumed during the event. If the particular event is organized as a series of sub-events (e.g., set plays from scrimmage in a football game, acts in a play, songs in a concert), it would be advantageous for such a system to make the captured information of the most recent sub-event available to users (e.g., in a playlist) as soon as (or possibly before) the sub-event is completed.

SUMMARY OF THE INVENTION

An exemplary embodiment of the present invention is directed to a system for asynchronously collecting information of an event (e.g., a football game) in real-time. Such an event may be organized as a series of sub-events (e.g., plays from scrimmage). The system may include one or more terminals situated at the venue (e.g., stadium) of the event. Each of these terminals may be a portable processor-based device, e.g., a smartphone, a tablet computer, or a laptop computer. At least one terminal is configured to capture information of a sub-event (e.g., video data, audio data, still images, and/or metadata), and transmit the captured information to an aggregating device (e.g., a server or another terminal), which aggregates the captured information according to sub-events. Also, a primary terminal transmits a command notifying the aggregating device and/or the other terminals in real-time of the start a particular sub-event. In response to this command, a corresponding sub-event identifier may be created in real-time. As such, the information captured by a terminal during the particular sub-event can be recorded in association with the particular sub-event by virtue of the corresponding sub-event identifier.

According to a further embodiment of the present invention, the terminals may be configured to display a playlist of the information captured by terminal(s), and organized so that a user can select from among the captured information according to sub-event identifiers.

According to a further embodiment of the present invention, the data network may be a cloud based network, and the aggregating device may be a server. In response to receiving a command from the primary terminal of the start of a particular sub-event, the server may obtain the corresponding sub-event identifier (i.e., receive the identifier from the primary terminal, or create a new identifier), and transmit the sub-event identifier in real-time to the other terminals. Further, upon receiving information captured of the particular sub-event by one of terminals, the server records that information in association with the corresponding sub-event identifier, and transmits either the information itself or a link to the information to the other terminals in real-time. This allows the other terminals to update their respective playlists in real-time as information is captured of the particular sub-event.

According to an alternative embodiment, however, the data network connecting the terminals may be a peer-to-peer (P2P) network, and other terminals may perform the operations of an aggregating device. As such, the primary terminal may transmit the command notifying the start of the particular event to the other terminals. In response to this command, the other terminals obtain a sub-event identifier corresponding to the particular event in real-time. Accordingly, any captured information of the sub-event, which is captured locally or received from another of the terminals, may be recorded in association with the obtained identifier, and used to update the terminal's playlist, in real-time.

According to another exemplary embodiment of the present invention, at least one of the terminals may have the capability to capture information of a particular sub-event in a combination of different types. For instance, the terminal may be capable of capturing video data of the sub-event in combination with metadata and/or a still image of the sub-event.

In a further embodiment, the terminal may stream the video data of the particular sub-event (e.g., to a server or other terminals) in real-time as the video is being captured, and also provide live coding functionality of asynchronously capturing and transmitting other types of information of the particular sub-event. For instance, after a user inputs a command to capture video, thereby causing the terminal to start streaming the captured video to the server/other terminal, the user may also input metadata into the terminal or instruct the terminal to capture a still image of the sub-event while the video is streaming. Once this metadata or still image is obtained, the terminal may transmit it to the server/other terminal while the video is still streaming.

Other aspects and possible embodiments of the present invention will be made clear by the following Detailed Description in view of the accompanying drawings.

BRIEF DESCRIPTION OF THE DRAWINGS

FIG. 2A and FIG. 2B are block diagrams specifically illustrating alternative embodiments relating to a cloud-based system and a peer-to-peer (P2P) system, respectively, for asynchronously collecting information of an event in real-time.

FIG. 3A and FIG. 3B are flowcharts illustrating operations performed by a terminal and a primary terminal, respectively, according to exemplary embodiments.

DETAILED DESCRIPTION

Figure 1A:
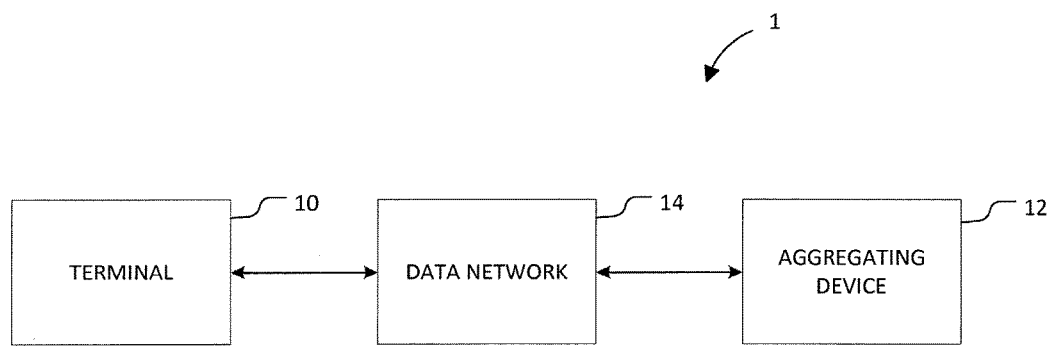
FIG. 1A and FIG. 1B are block diagrams generally illustrating a system for asynchronously collecting information of an event in real-time according to an exemplary embodiment.

Exemplary embodiments of the present invention are directed to a system and method of asynchronously collecting different types of information for an event (e.g., football game) and aggregating the information in real-time according to sub-events (e.g., plays from scrimmage). This information may be captured, shared, and consumed by users attending the event. The information may be aggregated in a format that is easily consumed by the same type of device which captures the information.

According to an exemplary embodiment, one or more terminals (e.g., smartphones or tablet or laptop computers) can be used by spectators or participants of an event to capture or enter information (video, still images, metadata) of sub-events as they occur. The terminals may also be used by the users to enter metadata describing the sub-event in real-time. Using principles of the present invention, each item of information captured/entered using these terminals may be independently transmitted in real-time, either through a cloud server or a peer-to-peer network, to the other terminals at the event. For instance, each item of captured information may be presented in each of the terminals in a playlist, which is organized according to sub-events. As such, by selecting a particular sub-event in the playlist, each user can gain access to each piece of information that was captured in association with that sub-event by the terminals.

For example, with the present invention, coaches at a football game may use such terminals to asynchronously capture various types of media data of a particular play from scrimmage (video data, still images), as well as metadata describing that play (whether it is a run, pass, or kick; whether it pertains to offense or defense, etc.). The information captured by each terminal may be transmitted to, and aggregated by, another device (e.g., server or another terminal) in real-time. Utilizing principles of the present invention, the information captured for each play may be collected and aggregated so as to automatically populate the playlist on each coach's terminal within seconds. Accordingly, by the time the play is over, each coach may be able to view the video, formation image(s), and metadata of that play before the next play commences.

The present invention may be used at other types of events, e.g., at a play or a concert. For instance, a play can be thought of as an event organized as a series of sub-events (i.e., scenes). During play rehearsal, the director (as well as other crew members) could utilize the terminals of the present invention to capture video, audio, and/or still images of each scene, as well as asynchronously entering metadata to identify the specific act and scene (and, possibly, to provide notes critiquing the acting). For instance, after an actor's scene is over, the director may be able to review audio/video data of the scene with the actor to help improve the performance.

In another example, the present invention could be used at a concert to capture audio (and video) data of each song or musical piece as it is performed, while asynchronously capturing metadata (title, songwriter or composer, etc.) and possibly still images. Even before the song or piece is over, the terminals' playlists may be populated with the data captured up to that point. For instance, this may allow concert-goers to review metadata associated with a song/piece while it is being performed.

Further, according to principles of the present invention, one of the terminals may be used to stream video data and/or audio data, which is currently being captured of a particular sub-event (e.g., football play), to a cloud server or other terminal(s). Moreover, in the present invention, the terminal which is capturing and streaming the video and/or audio data may have a "live coding" functionality, which allows it to asynchronously capture and transmit other types of information of the sub-event (e.g., metadata and/or still images) to the cloud server or other terminals, in real-time, while the video and/or audio data is streaming.

A more detailed description of the invention will now be provided in reference to the accompanying drawings.

Figure 1B:
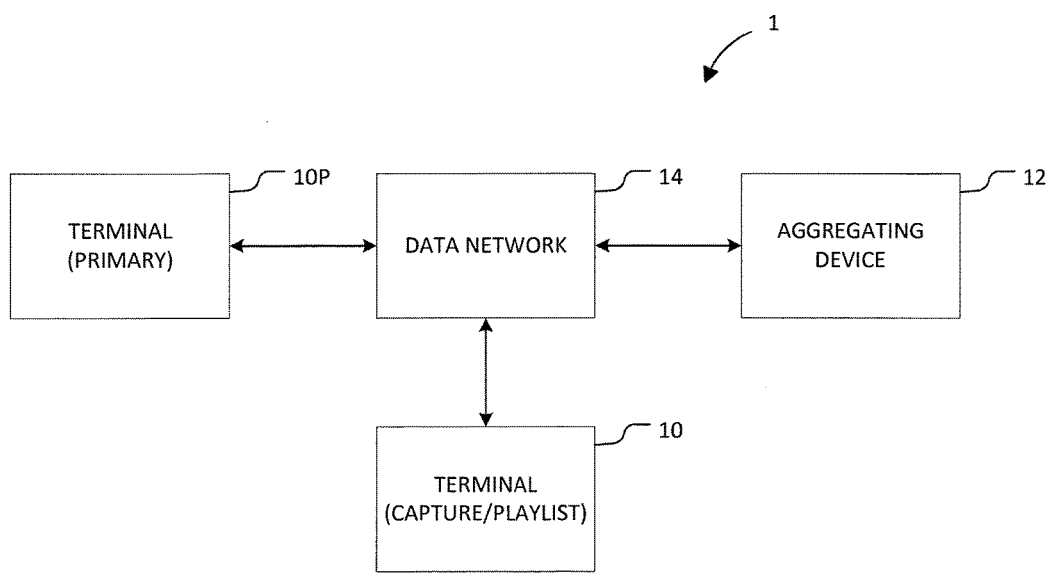

FIG. 1A and FIG. 1B are block diagrams generally illustrating a system 1 for asynchronously collecting information of an event in real-time according to an exemplary embodiment.

Particularly, FIG. 1A illustrates a system 1 including a terminal 10 and an aggregating device 12, which are communicatively connected via a data network 14. According to an exemplary embodiment, the terminal 10 is an electronic computing device, with data capturing capability, which is situated at a venue of an event (e.g., stadium or field for a football game). This terminal 10 should include one or more of the following functionalities: capturing and playing back video and/or audio data, capturing and displaying still images, inputting and reproducing metadata represented textually and/or graphically. For instance, it is contemplated that the terminal 10 may be a smartphone (e.g., iPhone® or Android™ phone), a tablet or laptop computer, or other types of devices (e.g., digital camera or camcorder) with network capability. However, it is not strictly necessary for the terminal 10 to be a portable device, and instead could comprise a relatively stationary device. At any rate, it is contemplated that the terminal 10 may include one or more of the following information capturing devices: a video data capture device, an audio data capturing device, a still-image capturing device, and an input device for obtaining metadata. Moreover, it is contemplated that the terminal 10 will include a local data storage device capable of storing the information captured by any and all of such devices included therein, and appropriate output devices (e.g., display screen, audio speakers, video/audio data reproducing device, etc.) for reproducing or outputting the stored information.

As to the aggregating device 12 of FIG. 1A, according to an exemplary embodiment, this device 12 may be a similar type of device as described above in connection with the terminal 10, and it may similarly be situated at the event venue. In such an embodiment, the data network 14 may be configured as a peer-to-peer (P2P) network (as will be discussed in more detail below in connection with FIG. 2B and FIG. 6). According to an alternative embodiment, however, the aggregating device 12 may be configured as a server located off-site from the venue, and the data network 14 may constitute a cloud network (e.g., Internet) (as will be discussed in more detail below in connection with FIG. 2A and FIG. 5).

In reference to the alternative embodiment, it should be noted that the term "server," as used within this specification and accompanying claims, may refer either to a single computing system or device, or to a plurality of computing systems or devices which operate in a coordinated manner to perform operations described hereinbelow (and which may or may not be located at the same site). Thus, use of the term "server" in this specification and accompanying claims is not intended to be limiting on the number of computers or devices used to perform the corresponding operations. For instance, a "server" may include one server device (e.g., streaming server), which is operable to receive and aggregate certain types of information (e.g., streaming video and/or audio), in conjunction with another server device (e.g., application server) operable to receive and aggregate other types of information (e.g., metadata). An example of this will be described in more detail below in connection with FIG. 2A.

Referring again to FIG. 1A in an exemplary embodiment, the terminal 10 captures information pertaining to an event which is organized as a series of sub-events. The terminal 10 may include a user interface (which will be described below in connection with FIG. 9A) through which a user can instruct the terminal 10 to capture various types of media data (video, audio, and/or still images) and/or metadata. The captured information is transmitted in real-time through the data network 14 to the aggregating device 12. At the aggregating device 12, the received information is aggregated according to the specific sub-event to which it pertains. Particularly, the aggregating device 12 may aggregate and store the received information in a format optimized for, or at least facilitating, the retrieval of such information according to its corresponding sub-event. This aggregated information may then be presented in a playlist which may be displayed on either or both the terminal 10 and the aggregating device 12.

For instance, if the aggregating device 12 is configured as a server located off-site from the event venue, the server may include one or more databases configured for the storage and retrieval of the captured information according to sub-event identifiers. The purpose of a sub-event identifier is to uniquely identify the particular sub-event to which each item of information pertains. Once an item of captured information (e.g., a video, still image, or piece of metadata) is matched up by the server to a corresponding sub-event identifier and recorded in the appropriate database, the server may immediately notify the terminal 10 to add this item to the terminal's 10 playlist. To perform this notification, the server may transmit either the information item itself, or a link (e.g., hyperlink) to the item as stored in the server, along with the corresponding sub-event identifier. Further, this notification may be transmitted by the server in the form of a "push" type message, or alternatively in it may be transmitted in response to periodic client requests transmitted by the terminal 10.

On the other hand, if the aggregating device 12 is configured as a user device, it may be capable of capturing information of each sub-event and/or displaying a playlist of the captured information similar to the terminal 10. If this is the case, the aggregating device 12 may simply be responsible for aggregating captured information (including data received via the data network 14, as well as information captured locally) after it has been received and matched up to the appropriate sub-event identifier. It should further be noted that the terminal 10 may also be configured as an "aggregating device" in the sense that it similarly aggregates information of the event, captured locally or received via the data network 14, for presentation on its own playlist.

Further, as shown in FIG. 1B, the system 1 may include multiple terminals 10 situated at the event venue and communicatively connected to the aggregating device 12 via the data network 14. Each of these terminals 10 may be configured to perform one or more of the following operations:
 capture media data (e.g., video, audio, still images) of a sub-event, and transmit the captured media data to the aggregating device 12 in real-time;
 capture metadata of a sub-event (user-inputted and/or automatically generated), and transmit it to the aggregating device 12 in real-time; and
 present a selectable playlist to the user of the information captured thus far, arranged according to sub-events.

Further, as shown in FIG. 1B, one of the terminals 10 may be configured as a "primary terminal" 10P meaning that it is responsible for notifying the other terminals 10 and the aggregating device 12 when each new sub-event begins. The primary terminal 10P may perform this function by transmitting a command or message to the aggregating device 12 and (optionally) to the other terminals 10.

For instance, a user may instruct the primary terminal 10P when each new sub-event begins, thereby prompting the primary terminal 10P to transmit a command notifying at least the aggregating device 12 of the start of the new sub-event. If the aggregating device 12 is a server on a cloud network, the server may, upon receiving the command, forward it to the other terminals 10 (or otherwise notify the other terminals 10 of the start of the sub-event) in real-time. In an alternative embodiment, where the terminals 10 are connected via a P2P type data network 14 (and the aggregating device 12 is a similar device as the other terminals 10), the primary terminal 10P may transmit the command notifying of the start of each sub-event directly to each terminal 10 (and the aggregating device 12).

Also, according to an exemplary embodiment, the primary terminal 10P may be responsible for creating the sub-event identifier, which is used by all of the terminals 10 and the aggregating device 12, to identify each particular sub-event. Accordingly, the primary terminal 10P may transmit this sub-event identifier within (or along with) the command that notifies the other terminals 10 and aggregating device 12 of the start of the new sub-event. Alternatively, the aggregating device 12 may create the sub-event identifier and distribute it to the terminals 10, 10P in response to being notified of the start of the new sub-event.

Referring again to FIG. 1B, if the aggregating device 12 is configured as a cloud server (according to one possible embodiment described above), the aggregating device 12 may be responsible for asynchronous collection and aggregation of all of the information of a particular sub-event, which are captured by the terminals 10, 10P. The server may also be responsible for distributing to each of the terminals 10, 10P each item of captured information, or a link thereto, in real-time. This distribution may be accomplished via a push type message (but this is not required). According to an exemplary embodiment, the server will attach the corresponding sub-event identifier to each item of captured information (or link thereto), to facilitate the presentation of such item on the playlist of the terminal 10, 10P. These operations will be described in more detail below in connection with FIG. 5.

On the other hand, if the system 1 of FIG. 1B is implemented in a P2P environment, each terminal 10, 10P may be configured to transmit each item of information of a sub-event it captures directly to the other terminals 10, 10P in real-time. As such, each terminal 10, 10P may also be configured to aggregate the captured information it receives from the other terminals, along with the information it has captured itself, into a format suitable for presentation on the playlist. In such an embodiment, each terminal 10, 10P can be considered as a type of aggregating device 12. These operations will be described in more detail below in connection with FIG. 6.

In order to illustrate the differences between the aforementioned alternative embodiments in more detail, reference will now be made to FIG. 2A and FIG. 2B, which are block diagrams specifically illustrating alternative embodiments of the present invention relating to a cloud-based system and a peer-to-peer (P2P) system, respectively. These figures are also intended to show examples of different types of terminals 10 which may be utilized in the present invention. For instance, these figures show that each terminal 10 may be configured as a laptop, a smartphone, a digital camera (or camcorder) with network capability, or a tablet computer. However, this list is certainly not intended to be exhaustive, and other computing or processor-based devices may be utilized.

Furthermore, while FIG. 2A and FIG. 2B suggest that the terminals 10 are configured for user operation, this need not always be the case. For instance, one of the terminals 10, which is particularly configured for capturing media data of the event, could be implemented, e.g., as a remote-controlled video camera or audio recorder.

FIG. 2A illustrates a particular embodiment involving a cloud-based system 1A. As such, a cloud network 14A (e.g., the Internet) communicatively connects the terminals 10, which are situated at the event venue, to a remote aggregating device 12 that is configured as a server (and thus situated at the "server-side"). As described earlier, while such an aggregating device 12 may be referred to as a "server," it is not limited to a single computing system (or location). For example, it could be configured to multiple server devices working in cooperation to perform the server operations described in this specification. In the specific example of FIG. 2A, the aggregating device 12 may include a streaming server 12A and an application server 12B. This would allow for the use of a server/database optimized for the storage and retrieval of streaming data (video and/or audio) (as embodied in streaming server 12A), in conjunction with another server/database optimized for the storage and retrieval of metadata (as embodied in application server 12B). Each of these server devices, when implemented as a component of the server or aggregating device 12, may share a common Globally Unique Identifier (GUID).

As to FIG. 2B, this figure illustrates a system 1B simply comprising a plurality of terminals 10, all located at the event venue, which are communicatively connected by a P2P network 14B such that each of the terminals 10 (e.g., laptop computer, smartphone, tablet, digital camera and/or camcorder) can communicate directly with each of the others. According to this embodiment, any and each of the terminals 10 may be configured with the functionality of an aggregating device 12 as mentioned earlier. Further, each of these terminals 10 may (but does not have to) have the functionality of presenting a playlist of the media data and metadata of the event, captured by each of the terminals, arranged according to the sub-events.

It should be noted that, while FIG. 2A and FIG. 2B are used to illustrate examples of different types of terminals 10 which may be used, these figures are not intended to require that any specific type of terminal 10 must be used, or that multiple types of terminals 10 be used. It is contemplated that all of the terminals 10 situated at the event venue may be the same general type of device (e.g., smartphone) or comprise any combination of different device types (e.g., a laptop and a tablet).

Now, reference will be made to FIG. 3A and FIG. 3B which are flowcharts illustrating operations performed by a terminal 10 and a primary terminal 10P, respectively, according to exemplary embodiments.

Figure 3A:
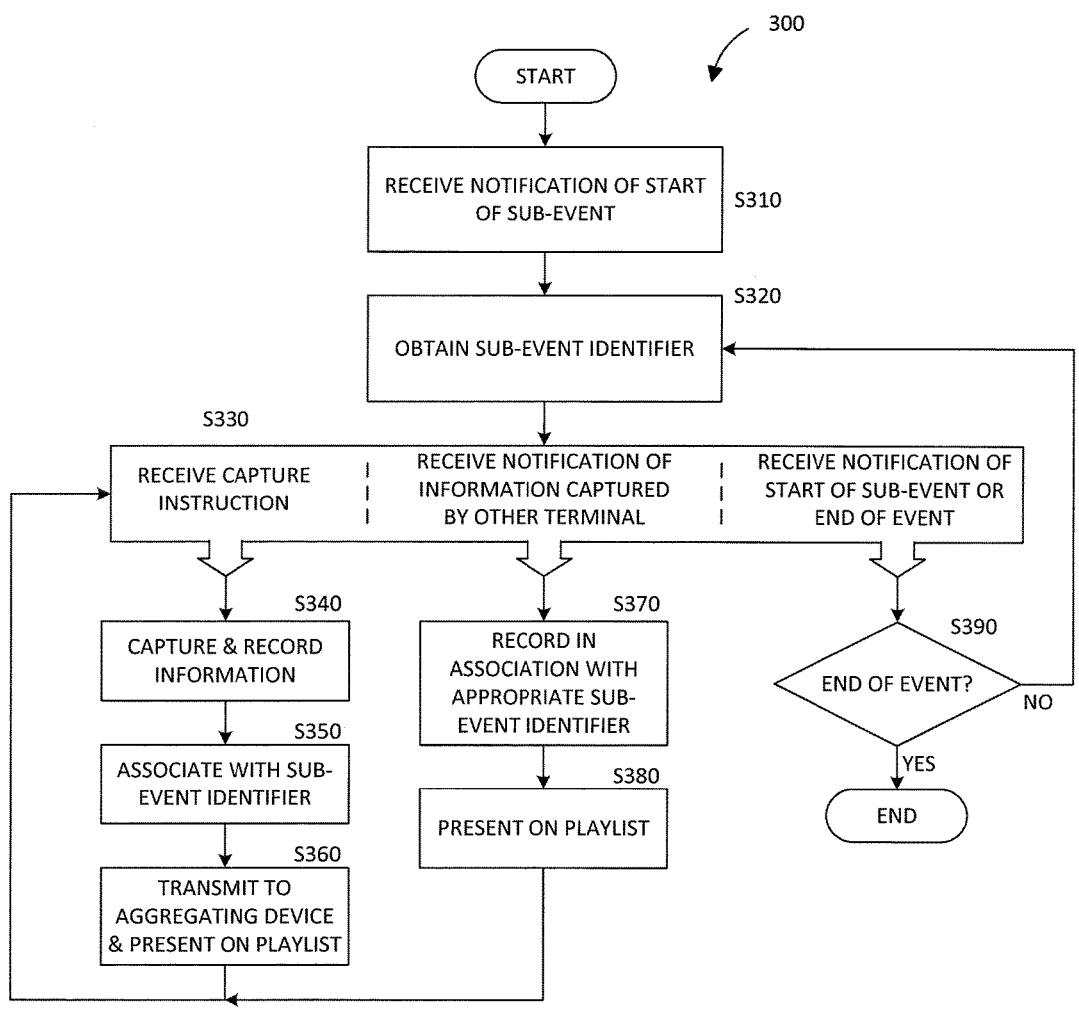
Figure 4:
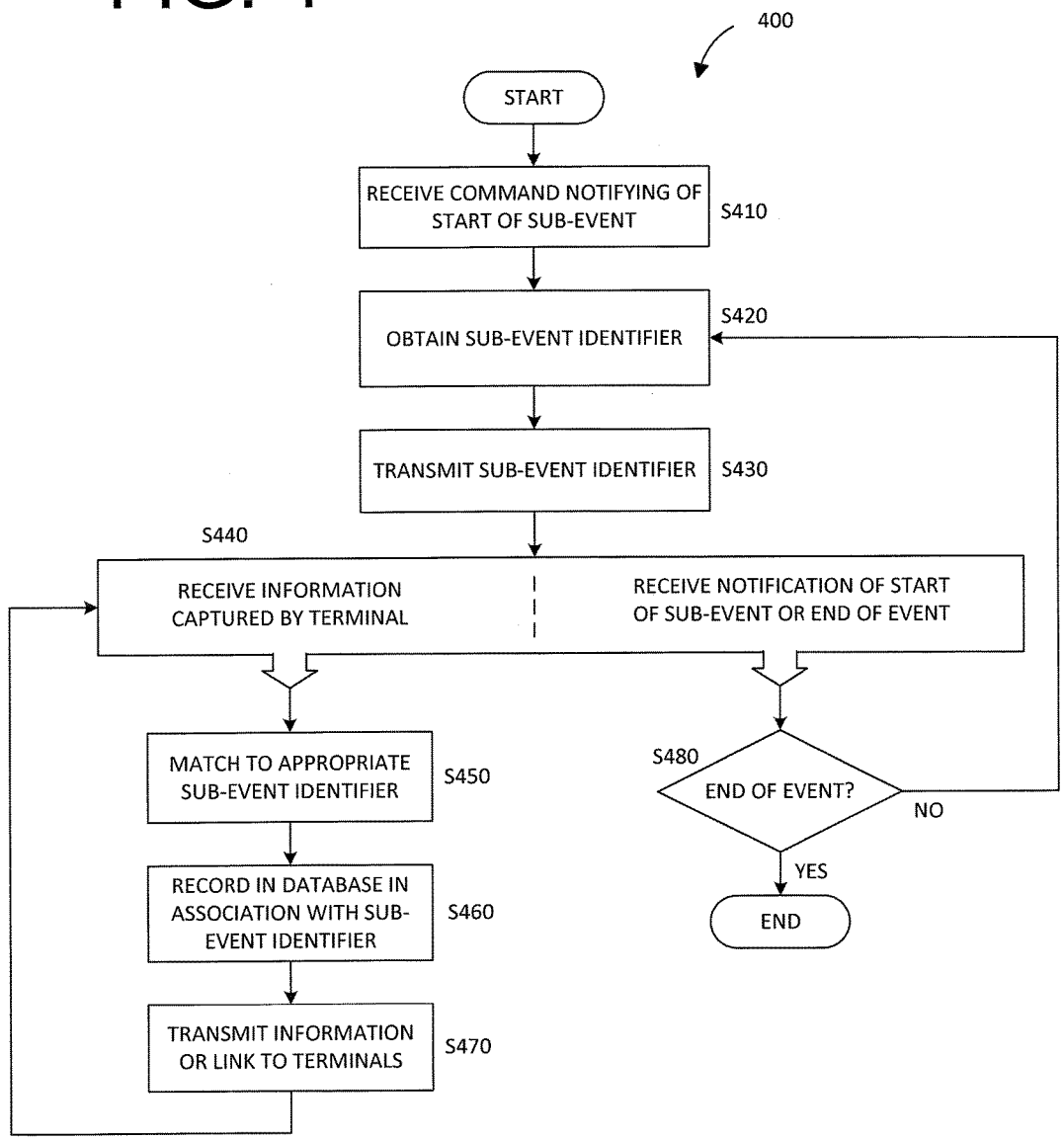
FIG. 4 is a flowchart illustrating operations performed by an aggregating device according to an exemplary embodiment.
Figure 7:
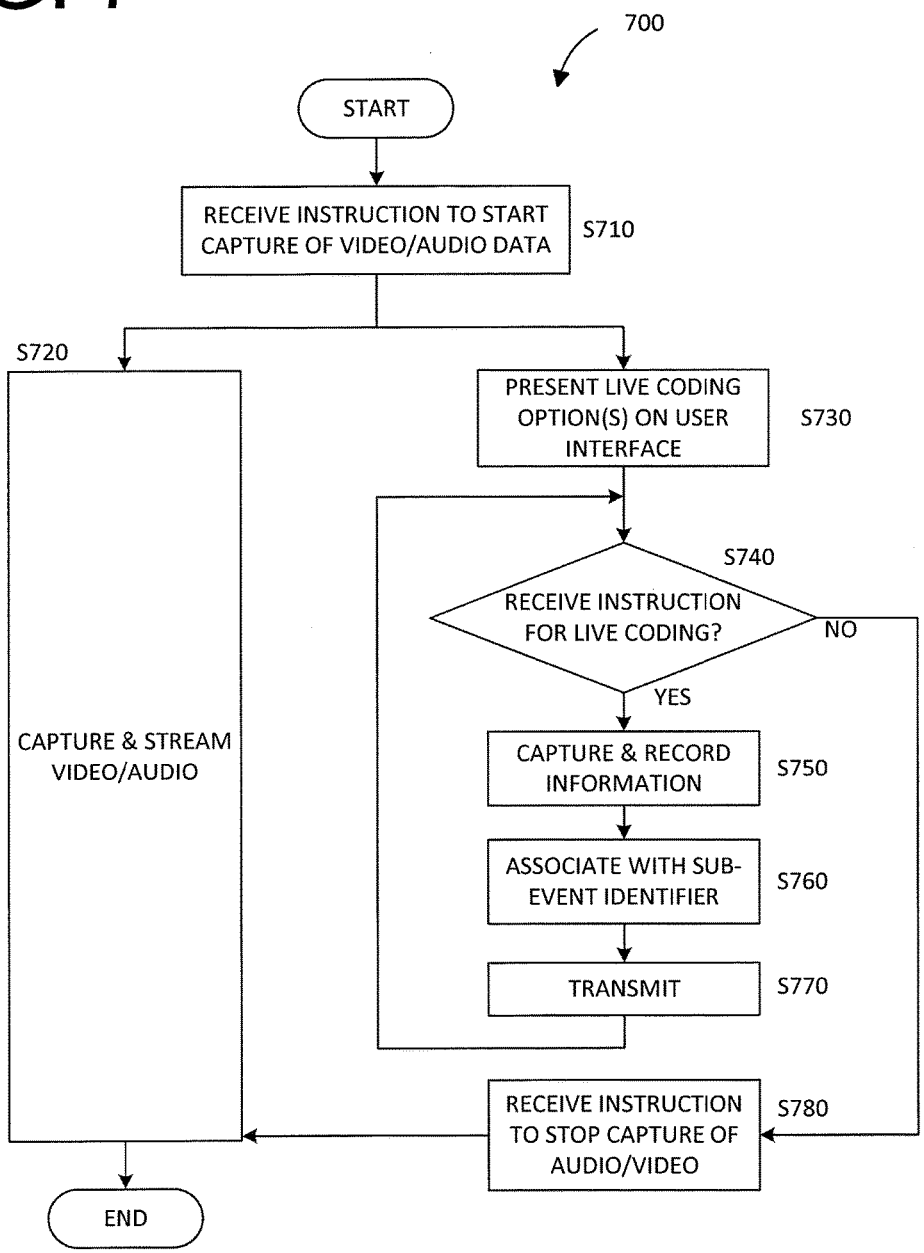
FIG. 7 is a flowchart illustrating operations performed by a terminal for live coding of streaming data according to an exemplary embodiment.

It should be noted that the flowcharts in FIG. 3A and FIG. 3B, as well as FIG. 4 and FIG. 7, are provided for purposes of illustration only, and are not intended to be limiting of the present invention. The processes disclosed in these figures may be modified and still remain within the spirit and scope of the present invention. For instance, whereas each of these flowcharts illustrates a sequence of operations, the order of these operations may be changed, and certain operations illustrated in these flowcharts may be omitted, while other operations not shown may be added.

It should be noted that a terminal 10, 10P may be programmed to perform the operations illustrated in FIG. 3A and FIG. 3B (as well as FIG. 7) in accordance with coded instructions that are executed by a computer processor implemented within the terminal 10, 10P. For instance, these instructions may be distributed to the terminal 10, 10P in the form of an "App" (i.e., application software designed to run on smartphones, laptops, and other portable devices), or other types of executable files (e.g., a browser or a browser plug-in). It is also possible that the functionality described herein can be implemented as "firmware" in certain types of devices configured as terminals 10, 10P.

Particularly, FIG. 3A illustrates a process 300 which may be performed by a given terminal 10 during an event.

According to operation S310, the terminal 10 may receive a notification of the start of a sub-event, e.g., in accordance with a command issued by a primary terminal 10 (as will be described later). If the event is a football game, the first sub-event registered in the terminals' 10 playlists could be the first play of the game, i.e., the opening kickoff. However, this may not always be the case. In fact, it not necessary for information of each and every sub-event within the event to be captured and represented in the playlist. For instance, during a football game, an offensive coach may want to obtain a playlist of only those plays during which his team is on offense. In fact, he may only want a subset of such plays, e.g., first-down plays. As such, it should be noted that, while the present invention can be used to aggregate the captured information according to sub-events, this does not require information of all of the sub-events to be captured and added to the playlist, and the choice of which sub-events are represented may be up to the users of the terminals 10, 10P.

Furthermore, it should be noted that the notification of the start of the sub-event according to operation S310 may be received from a server (aggregating device 12), e.g., if the terminal 10 is part of a cloud-based system 1A as illustrated in FIG. 2A. Alternatively, the terminal 10 may receive, as the notification of S310, a command or message transmitted directly from the primary terminal 10P, e.g., if operating in a P2P system as illustrated in FIG. 2B.

As shown in FIG. 3A, after the notification has been received in operation S310, it is contemplated that the remaining operations (or at least a subset of them) will be performed in "real-time." This means that the corresponding operations will be performed without perceivable delay. The real-time execution of these operations may be implemented through the use of coded time constraints or "deadlines," or through priority sequencing of operations, but neither of these is required.

According to FIG. 3A, in operation S320, the terminal 10 obtains the sub-event identifier which corresponds to the sub-event that has just started. For instance, this sub-event identifier may be received as part of the message (either from an aggregating device 12 or the primary terminal 10P). Alternatively, it is possible that each terminal 10 may be programmed to create a new sub-event identifier, e.g., according to rules or conditions ensuring that the identifiers created by each of the terminals 10, 10P and the aggregating device 12 are the same or consistent.

Next, the terminal 10 enters an operative state illustrated in S330 in which it is capable of capturing information of the sub-event, e.g., based on a user-inputted instruction, and also receiving information (or at links thereto) of the sub-event captured by other terminals 10, 10P to be added to the terminal's 10 playlist. In this operative state S330, the terminal 10 may also be notified (e.g., by a server or another terminal 10, 10P) that information has been captured by one of the other terminals 10, 10P. Also, in operative state S330, the terminal 10 may receive notification that a new sub-event has started or that the event has ended.

First, a situation in which the terminal 10 is used to capture information will now be considered. In describing this situation, reference will now be made to FIG. 9A, which illustrates a user interface 900A provided on a terminal 10, 10P to receive user's instructions for capturing various types of media data and/or metadata, according to an exemplary embodiment. It should be noted that, in FIG. 9A-FIG. 9D, the user interface 900A is illustrated as a touchscreen interface, e.g., for a smartphone or tablet, but this is merely for the purpose of example. The user interface 900A may be modified for use with other types of terminals 10, 10P using a keyboard (virtual or physical), dedicated hardware buttons, etc. to receive user input. Referring to FIG. 9A again, the user interface 900A is shown as corresponding to a "Data Capture" mode for the terminal 10, 10P. However, through the use of a control 98 (e.g., touchscreen button), the user may toggle the terminal 10, 10P into a "Playlist" mode for displaying the playlist (which will be described below in connection with FIG. 9B). The user interface 900A may further present a user with controls (e.g., 90A-90C, 92A-92D) to instruct the terminal 10, 10P to capture various types of media data and metadata for a particular sub-event. For instance, the user can instruct the terminal 10, 10P to start/stop video capture by pressing button 90A, or alternatively instruct the terminal 10, 10P to start/stop audio capture by pressing button 90B. Similarly, controls 92A-92D may be used by the user to input various types of metadata to describe a current sub-event. Referring again to the specific example in which the event is a football game, control 92A may allow for the user to designate whether the current play is one in which the team of interest is on offense (O) or defense (D). Control 92B may allow the user to designate that current play is a kicking (K), running (R), or passing (P) play. Control 92C allows the user to designate whether the current play is happening on first down ($1^{st}$), second down ($2^{st}$), third down ($3^{rd}$), or fourth down ($4^{th}$).

Figure 9A:
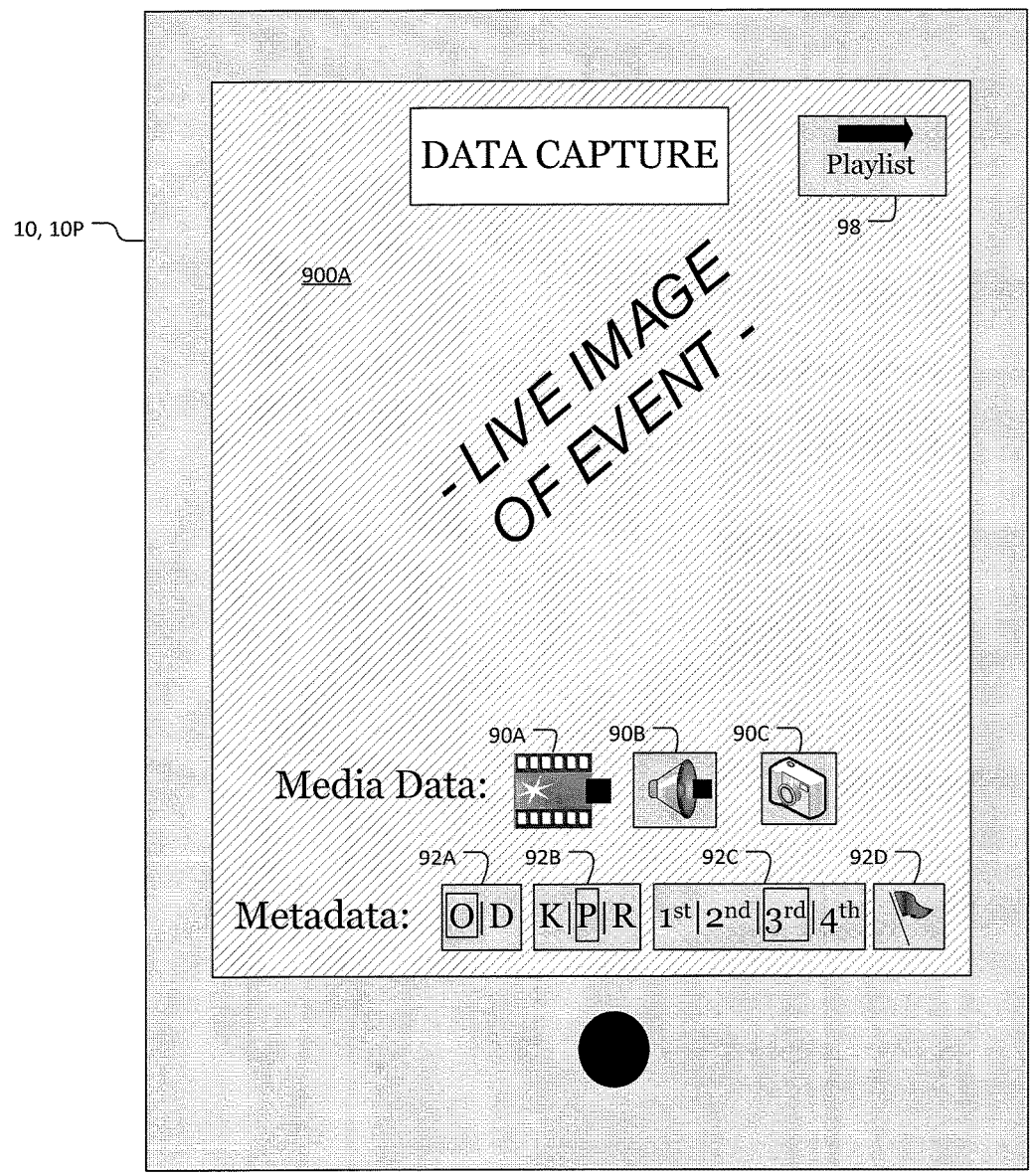
FIG. 9A, FIG. 9B, FIG. 9C, and FIG. 9D illustrate respective user interfaces that may be implemented in a terminal or a primary terminal according to exemplary embodiments.

Also, in the Data Capture mode illustrated in FIG. 9A, the user interface 900A may be designed to display, in the background, a live view or image of the current sub-event (e.g., coming from a forward-facing camera on the terminal 10, 10P). As such, the various controls for capturing media data and/or metadata (90A-90C, 92A-92C) may be overlaid on top of this live image. However, it is not absolutely necessary for the user interface 900A to provide this live view.

Referring again to FIG. 3A, if the terminal 10 is instructed by the user (via user interface 900A, for example) to capture media data or metadata of the present sub-event, operation S340 is invoked. In S340, the terminal 10 captures the appropriate information and records it in local data storage. According to operation S350, the recorded information is associated with the appropriate sub-event identifier (obtained in S320). Then, according to operation S360, the captured information is transmitted to the aggregating device 12. If operating in a cloud-based system 1A, operation S360 may cause the terminal 10 to transmit the captured information to a server which is designated as the aggregating device 12. However, in a P2P system 1B, some or all of the terminals 10, 10P may take on the role of an aggregating device 12. Thus, in a P2P embodiment, operation S360 may cause the captured information to be transmitted directly to at least one other terminal 10, 10P (e.g., the primary terminal 10P) or all of the other terminals 10, 10P in the system 1B.

According to operation S360, the terminal 10 may append the sub-event identifier (obtained in S320) to the captured information prior to transmission. This may facilitate the aggregating device 12 in performing its function of aggregating the captured information according to sub-event.

It should be noted that, according to FIG. 3A, the terminal 10 may be configured to stream certain types of information (e.g., video and/or audio data) to the aggregating device 12 (i.e., server or other terminal(s) 10). In such cases, the operations of S340, S350, and S360 may be merged in such manner which allows the capture and transmission of the streaming data to occur synchronously.

Referring again to S330, if in this operative state the terminal 10 receives notification of information of the sub-event being captured by another of the terminals 10, 10P, this notification may be accompanied with the item of captured information so that it can be stored in the terminal's 10 local data storage and added to the playlist. Alternatively, it is possible (especially in a cloud-based system 1A) for the notification to be accompanied by a link (e.g., hyperlink) to a particular server location where the captured information is stored and can be accessed. Accordingly, in S370, the received item of information or link thereto is recorded in association with the sub-event identifier obtained in S320.

Thereafter, this item of information (or the corresponding link) may be added to the playlist as shown in operation S380.

However, in operative state S330, the terminal 10 could receive another type notification, i.e., one indicating that a new sub-event has started or that the event has ended. Here, processing would proceed to operation S390 where it is decided whether or not the event has ended. If the event has ended, the process 300 may end. On the other hand, if the terminal 10 has simply been instructed that a new sub-event has started, processing may return to operation S320 so that the terminal 10 may obtain a new sub-event identifier and proceed to the operative state S330 so that captured information of this new sub-event can potentially be added to the playlist.

It is of particular note that the terminal 10 may execute the sub-process of S340-S360 asynchronous and independent of the sub-process of S370-S380, and also asynchronously of the notifications of the start of new sub-events. This means that each of the terminals 10, 10P can capture information of the sub-event at its own timing, without being synchronized to the capture operations of other terminals 10, and yet such information can be added to all of the terminals' 10 playlists in real-time. Accordingly, different terminals 10, 10P do not need to coordinate their information-capturing operations with one other, and yet each item of information captured by these terminals can be instantly (or almost instantly) added to each terminal's 10, 10P playlist as soon as it is captured.

It should also be noted that, as process 300 is being performed, the terminal 10 may also be configured so that the user can instruct it to display the playlist, thereby causing another user interface 900B (illustrated in FIG. 9B) to be provided on the terminal 10. In this "Playlist" mode, the user may further be given the option to select and view (or listen to) any item of information on the playlist, thus causing the terminal 10 to operate in a "Review" mode in which another user interface 900C (illustrated in FIG. 9C) may be provided on the terminal 10. These different user interfaces 900B, 900C and modes will be described in more detail in connection with FIG. 9B and FIG. 9C below.

Next, the operation of the primary terminal 10P will be discussed in particularity. FIG. 3B is a flowchart illustrating a process 300P which may be performed by the primary terminal 10P. It should be noted that the primary terminal 10P may, in many ways, be configured and operate in a similar manner to the other terminals 10P. As such, it is contemplated that many of the operations performed by the primary terminal 10P will be similar to those performed by the other terminals 10. Accordingly, many of the operations illustrated in FIG. 3B will be similar to operations illustrated in FIG. 3A. Such operations in FIG. 3B are given similar reference numbers as the similar operations in FIG. 3A, and a detailed description of such operations will not be repeated here.

According to an exemplary embodiment, the primary terminal 10P is responsible for designating to the other terminals 10, and the aggregating device 12, when a new sub-event has started. However, as shown in FIG. 3B, the primary terminal 101) is instructed when each new sub-event begins. This is shown in operation S305, where the primary terminal 10P receives an instruction indicating that a sub-event has started. In an exemplary embodiment, a user may input an instruction to the primary terminal 10P indicating that the sub-event has started. It is even possible for this instruction to be tied in with a user instruction for capturing media data or metadata. For instance, it may be assumed that the primary terminal 10P will capture (and possibly stream) video of each new sub-event, and thus the instruction by a user to start video capture (e.g., via control 90A of FIG. 9A) may also serve as the instruction indicating the start of a new sub-event. However, the user may instruct the primary terminal 10P of the start of a particular sub-event in other ways. It is also possible, in an alternative embodiment, that this instruction is not inputted to the primary terminal 10P by a user. Instead, such instruction may alternatively be issued to the primary terminal 10P by an external device via the data network 14.

In FIG. 3B, after the primary terminal 10P has received the instruction indicating the start of a sub-event, the remaining operations of process 300P may be performed in real-time. Particularly, the primary terminal 10P may create a corresponding sub-event identifier for that sub-event according to operation S315. Thereafter, in operation S325, the primary terminal 10P may transmit a command to the aggregating device 12 and/or the other terminals 10 to notify them of the start of the sub-event. This command may include the sub-event identifier created in S315, but does not have to include such identifier. After this command is transmitted, the primary terminal 10P enters an operative state S335 as shown in FIG. 3B. In this operative state S335, the primary terminal 10P may behave similar to how a terminal 10 in the operative state of S330 of FIG. 3A behaves. I.e., the primary terminal 10P may respond to an inputted instruction to capture information, as well as received notifications regarding information captured by other terminals 10, by executing in real-time a similar sequence of operations as described above in connection with a terminal 10 in the operative state S330. However, one difference between the operative state S335 of the primary terminal 10P and the operative state S330 of other terminals 10 is that a user may input an instruction to the primary terminal 10P to indicate the start of the next sub-event. This may be the same type of user instruction received in operation S305. For example, in operative state S335, the primary terminal 10P may interpret a new user-instruction to start capturing a video (i.e., after the user has already inputted a stop instruction for the previous video) as an instructive indicating the start of the next sub-event, which may cause processing to return to S315.

Of course, as similarly described above in connection with FIG. 3A, as process 300 is being performed, the terminal 10P may also be configured so that the user can instruct it to display the playlist, thereby causing another user interface 900B (illustrated in FIG. 9B) to be provided on the terminal 10P. In this "Playlist" mode, the user may further be given the option to select and view (or listen to) any item of information on the playlist, thus causing the terminal 10P to operate in a "Review" mode in which another user interface 900C (illustrated in FIG. 9C) may be provided on the terminal 10P. These different user interfaces 900B, 900C and modes will be described in more detail in connection with FIG. 9B and FIG. 9C below.

Now the operation of the aggregating device 12, particularly in regard to the embodiment of a cloud-based system 1A (as shown in FIG. 2A) will be described. FIG. 4 illustrates a flowchart of a process 400 that is performed by such an aggregating device 12, which may be configured as a server (which may or may not be comprised of multiple server computing systems operating in a coordinated manner). As shown in FIG. 4, the aggregating device 12 receives the command, transmitted by the primary terminal 10P, notifying of the start of a sub-event in operation S410. Then, the following operations of process 400 may be performed in real-time by the aggregating device 12. According to operation S420, the aggregating device 12 obtains a sub-event identifier. For example, the sub-event identifier may have originated from the primary terminal 10P. Thus, the sub-event identifier may be included as part of the command, which is received by the aggregating device 12 from the primary terminal 10P, notifying of the start of the sub-event. Alternatively, the aggregating device 12 may be responsible for creating the sub-event identifier. After obtaining this sub-event identifier, the aggregating device 12 may transmit it to the other terminals 10 (which may or may not include the primary terminal 10P) according to operation S430.

According to FIG. 4, the aggregating device 12 may enter an operative state S440 for receiving information captured by the terminals 10 via the cloud-based network 14A. The aggregating device 12 aggregates the received information by matching it to an appropriate sub-event identifier according to operation S450. Particularly, each item of information captured by a terminal 10, 10P may be appended with a sub-event identifier prior to being transmitted to the aggregating device 12. Thus, in S450, the aggregating device 12 may aggregate the received item of information by matching the appended sub-event identifier to one already obtained according to S420. However, it is also possible that, at least for certain types of information (e.g., media data), the aggregating device simply matches the received item of information to an appropriate sub-event identifier based on the timing at which the item was received. For instance, assuming that a captured still image was transmitted by a terminal 10 to the aggregating device 12 in real-time, during the duration of a particular sub-event identifier, the aggregating device 12 may simply match the received still image to the corresponding sub-event identifier that was in force as of the duration of the particular sub-event.

Once a received item of information that has been matched up to an appropriate sub-event identifier according to operation S450, it can now be stored in a database that is indexed according to the sub-event identifiers. As such, according to operation S460, the aggregating device 12 may store the received item of information in an appropriate location of such a database, in such manner that the item of information is retrievable on the basis of the sub-event identifier. Furthermore, according to operation S470, the aggregating device 12 may transmit the item of information or a link to the item in the database, appended with the appropriate sub-event identifier, to each of the terminals 10, 10P so that the item can be added to the terminals' 10, 10P respective playlists. For instance, the aggregating device 12 may transmit a link (e.g., hyperlink), at least for certain types of captured information (e.g., video data), for purposes of the efficient utilization of network bandwidth. Furthermore, in operation S470, the item or link may be transmitted via a push type message to the terminals 10, 10P, although this is not required.

According to FIG. 4, the aggregating device 12 remains in the operative state S440 until such time that it receives a notification of the start of a new sub-event, or of the end of the event. When notified of the start of another sub-event (corresponding to a "NO" decision in operation S480), the aggregating device 12 transitions from operative state S440, and processing returns to operation S420 in order to obtain a sub-event identifier for the next sub-event. However, if the aggregating device 12 is notified of the end of the event (corresponding to a "YES" decision in S480), the process 400 may end.

Next, some examples will be described as to how the various components of a system 1A, 1B may interact to produce playlists. Particularly, these examples will be described in connection with FIG. 5 and FIG. 6, which are directed to alternative embodiments corresponding to a cloud-based system 1A and a P2P based system 1B, respectively. The diagrams in FIG. 5 and FIG. 6 are intended to illustrate examples of the sequence and interaction of the operations described above in connection with FIG. 3A, FIG. 3B, and FIG. 4.

Figure 5:
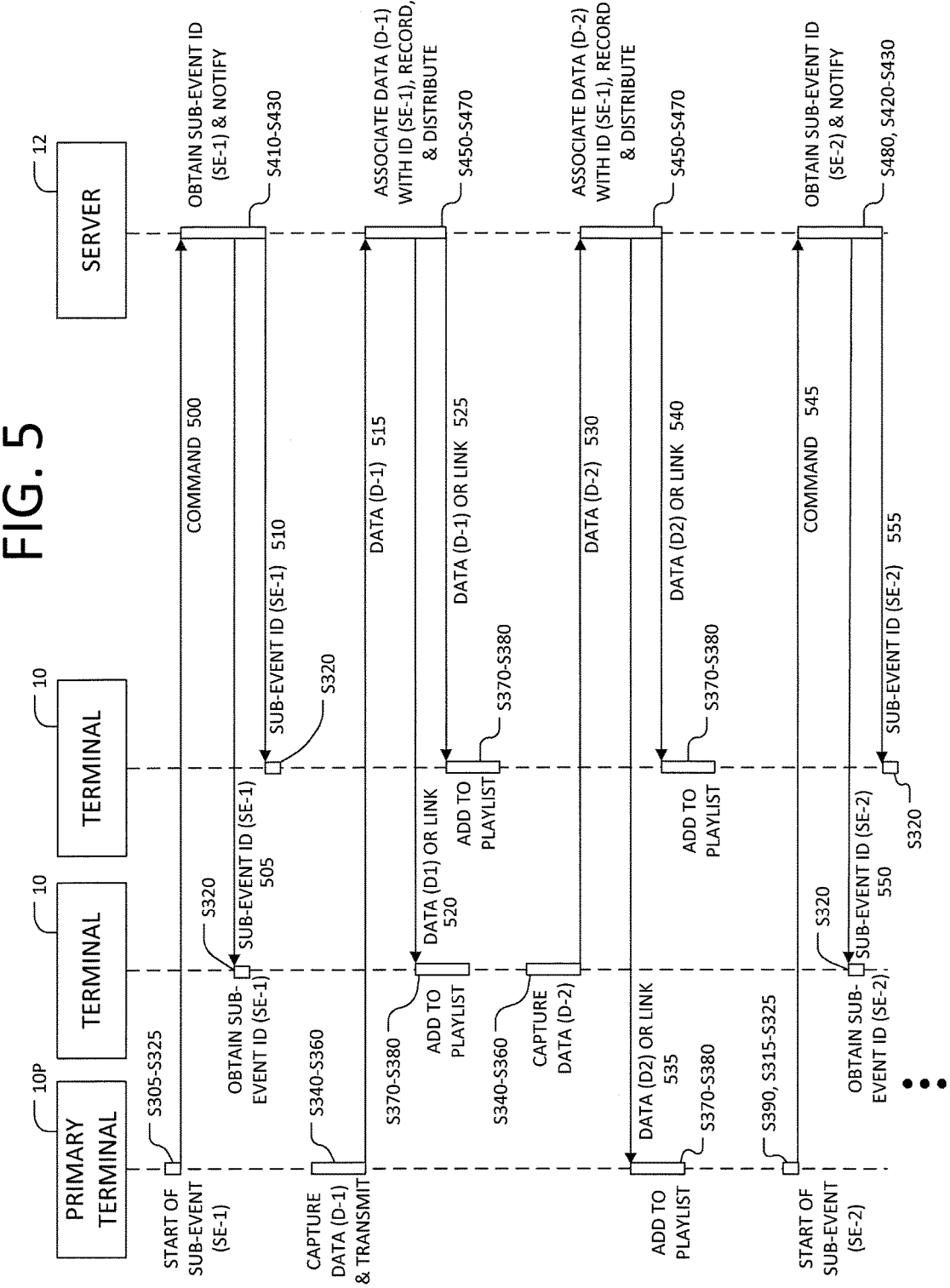
FIG. 5 is a diagram illustrating an example of data flow according to an exemplary embodiment particularly relating to a cloud-based system.
Figure 6:
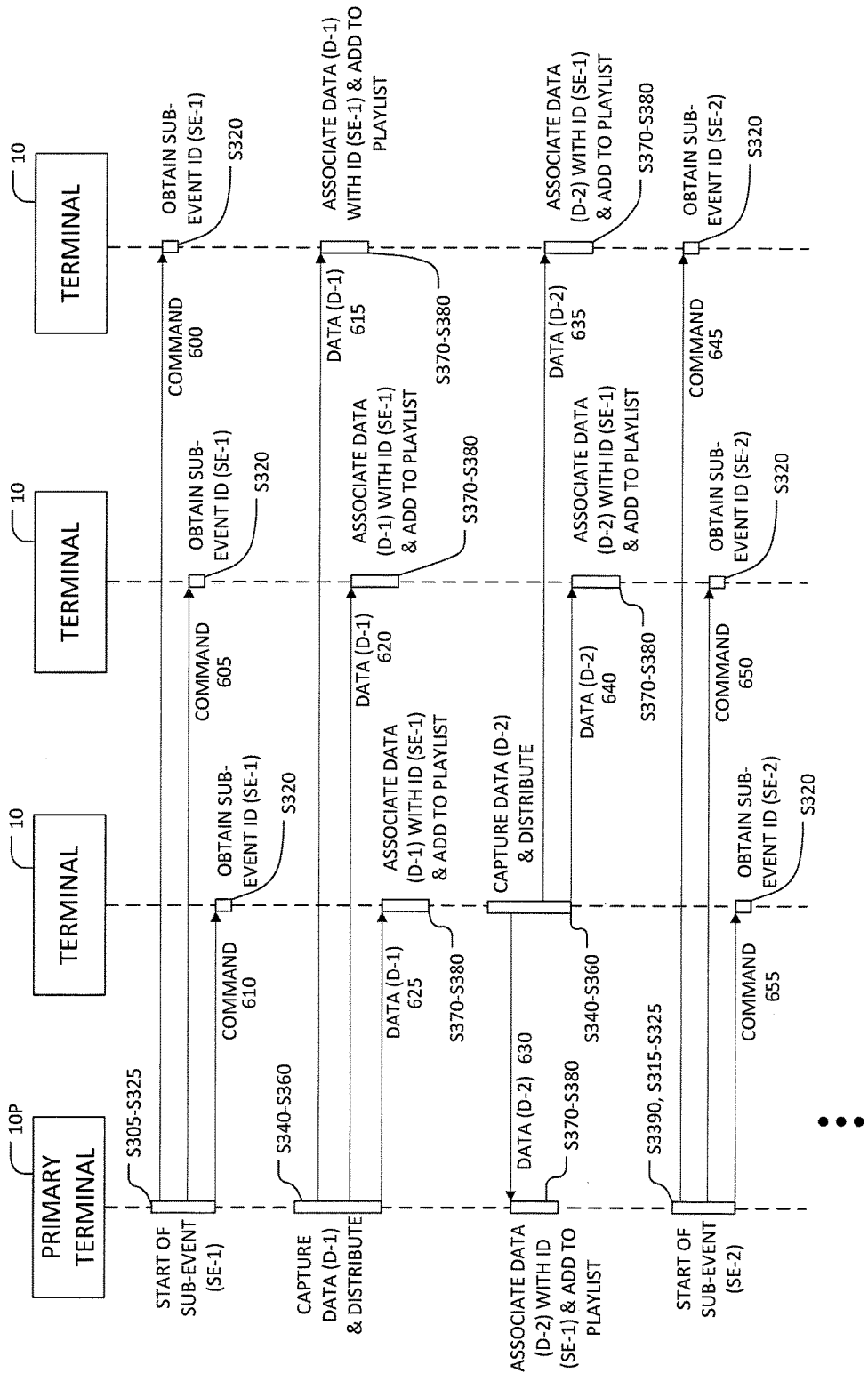
FIG. 6 is a diagram illustrating an example of data flow in an exemplary embodiment particularly relating to a P2P system.

Particularly, FIG. 5 is a data flow diagram illustrating an example of how information may be captured and added to the terminals' 10, 10P playlists, according to an embodiment utilizing cloud-based system 1A. As such, the flows illustrated in this figure represent data transmissions via a cloud-based network 14A. The primary terminal 101) may initiate operations at the start of a sub-event, e.g., in accordance with operations S305-S325 of process 300P (FIG. 3B). For purpose of example, the sub-event is shown in this figure as being assigned a sub-event identifier of "SE-1." Flow 500 represents the transmission from the primary terminal 10P of the command notifying the server (aggregating device 12) of the start of the sub-event. The server obtains the sub-event identifier and transmits it to the other terminals 10, e.g., in accordance with operations S410-S430 of process 400 (FIG. 4). Flows 505 and 510 represent transmissions of the corresponding sub-event identifier (SE-1) to the other terminals 10 situated at the event venue. As such, each of these terminals 10 receives the sub-event identifier (SE-1) in accordance with operation S320 of process 300 (FIG. 3A). Further, for purpose of example, FIG. 5 illustrates the primary terminal 10P as the first of the terminals 10, 10P which captures an item of information of this sub-event and transmits it, e.g., in accordance with operations S340-S360 of process 300P. This item of information is referred to as "D-1" in FIG. 5 for purpose of illustration (however, this is not intended to impose any requirement on the naming of captured information). As a specific example, if the event is a football game, the primary terminal 10P may be used to capture a still image of the offensive team's formation during a first play from scrimmage, and thus the captured item of information (D-1) may comprise image data.

As shown in flow 515 of FIG. 5, the server may receive this item captured data (D-1). As such, the server may associate it with the corresponding sub-event identifier (SE-1), record it in the database, and distribute either the item of captured information (D-1) itself, or a link to a corresponding storage location in the server database, to the other terminals 10, e.g., in accordance with operations S450-S470 of process 400. As such, flows 520 and 525 illustrate the respective transmissions of the data (D-1) or link to the other terminals 10. As described earlier, the server may also append the appropriate sub-event identifier (SE-1) to these transmissions. Upon receipt of the data (D-1) or link from the server, each of these terminals 10 may record the corresponding data (D-1) or link in correspondence with the sub-event identifier (SE-1), and add it to the playlist, e.g., in accordance with operations S370-S380 of process 300.

Further, FIG. 5 illustrates that one of the terminals 10 (other than the primary terminal 10P) captures a second item of information (referred to as "D-2") and transmits it, e.g., according to operations S340-S360. As a particular example, this item of information (D-2) may comprise video data captured after the ball is hiked during the first play from scrimmage of the aforementioned football game. Flow 530 represents the transmission of this item of captured information (D-2) to the server. Again, upon receiving this item of information (D-2), the server may associate it with the sub-event identifier (SE-1), record it in the database, and then distribute either the item of information (D-2) itself, or a link thereto, to the other terminals 10, 10p, e.g., in accordance with operations S450-S470. Flows 535 and 540 represent these respective transmissions, and also illustrate that the sub-event identifier (SE-1) may be appended to the respective transmissions. Accordingly, the primary terminal 10P and the terminal 10 receiving such transmissions may add the corresponding item of information (D-2) or link to their respective playlists.

According to the example of FIG. 5, after the capture and distribution in regard to item (D-2), the primary terminal 10P may be instructed of the start of a new sub-event, e.g., in accordance with operations S390 and S315-S325 of process 300P. According to FIG. 5, this new sub-event is assigned a new sub-event identifier of "SE-2" for purpose of illustration. Accordingly, flow 545 represents the transmission by the primary terminal 10P of a command notifying the server of the start of the new sub-event. The server obtains the new sub-event identifier (SE-2) and notifies the other terminals 10, e.g., in accordance with operations S480 and S420-S430 of process 400. Thus, flows 550 and 555 illustrate the respective transmissions of this notification to the terminals 10.

Now, reference will be made to FIG. 6, which is a data flow diagram illustrating how the same items of information (D-1 and D-2) described above might be captured and added to the playlists of terminals 10, 10P, according an alternative embodiment using a P2P system 1B. In this alternative embodiment, as shown in FIG. 6, it can be assumed that each flow represents a transmission between terminals 10, 10P over the P2P network 14B. Another difference in this alternative embodiment is that each of the terminals 10, 10P may be operative as an aggregating device 12. Accordingly, when the primary terminal 10P is instructed of the start of a sub-event, it may transmit the corresponding command notifying of the start of the event directly to each of the terminals 10 (e.g., according to operations S305-S325) The respective transmissions of this command are represented by flows 600, 605, and 610. Similar to FIG. 5, it will be assumed in FIG. 6 that a sub-event identifier of "SE-1" has been created for this initial sub-event. Further, information of this new sub-event may be captured, distributed, and added to the respective terminal playlists along the lines described above.

According to FIG. 6, upon receiving the command notifying of the start of the sub-event, each of the terminals 10 may obtain the corresponding sub-event identifier (e.g., according to operation S320). Further, when the primary terminal 10P is used to capture an item of information (D-1) of the sub-event, the primary terminal 10P may transmit this item (D-1) directly to each of the other terminals 10 (e.g., according to operations S340-S360). These transmissions are respectively represented by flows 615, 620, and 625 in FIG. 6. In response to receiving this transmission, each terminal 10 may associate the item of information (D-1) with the corresponding sub-event identifier (SE-1), and add the item (D-1) to the terminal's 10 own playlist (e.g., according to operations S370-S380).

Further, when another terminal 10 is used to capture an item of information (D-2) of the same sub-event, it may transmit the item (D-2) directly to each of the other terminals 10, 10P (e.g., according to operations S340-S360). These transmissions are respectively represented by flows 630, 635, and 640 of FIG. 6. Further, when each of the terminals 10, 10P receives the transmitted item (D-2), the terminal 10, 10P may associate the item (D-2) with the sub-event identifier (SE-1) and add the item (D-2) to its own playlist. Thereafter, the primary terminal 10P may be instructed of the start of a new sub-event (which will be assigned a sub-event identifier of "SE-2"), and transmit commands notifying of the start of this new sub-event to the other terminals 10. Thereafter, information of this new sub-event may be captured, distributed, and added to the respective terminal playlists along the lines described above.

Now, description will be made of a playlist which may be presented on each terminal 10, 10P according to an exemplary embodiment. Particularly, items of information which have been captured by the terminals 10, 10P, including media data and metadata, may be presented on this playlist. Further, this playlist may be organized according to sub-events, so that each item of information of a particular sub-event can be selected on the basis of the corresponding sub-event identifier.

Figure 9B:
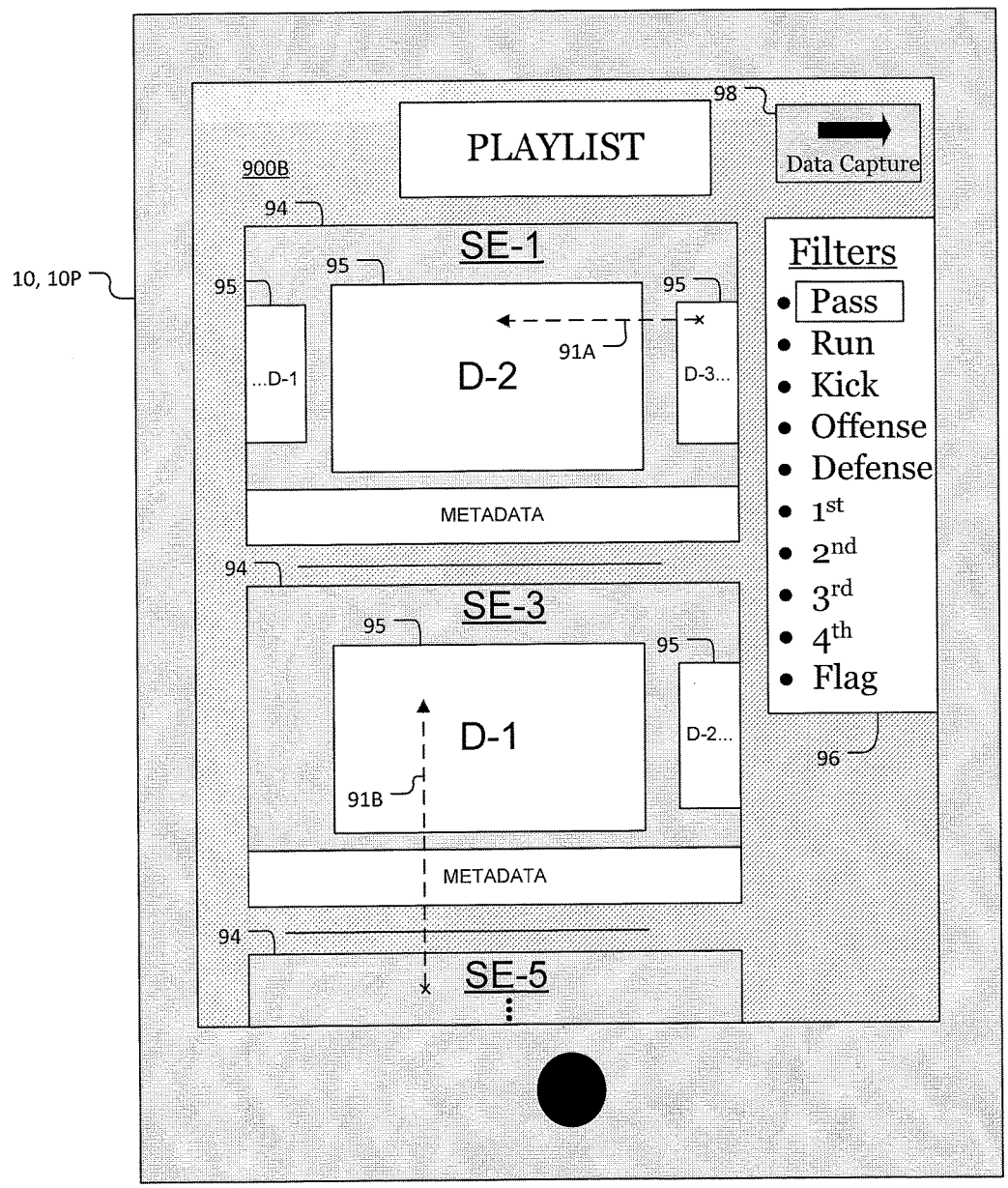

FIG. 9B illustrates a terminal 10, 10P operating in a "Playlist" mode. Particularly, FIG. 9B shows a user interface 900B on which the playlist may be displayed. For convenience's sake, the examples of sub-event identifiers used in connection with FIG. 5 and FIG. 6 (e.g., "SE-1," "SE-2," . . . ) will similarly be used in connection with FIG. 9. Also for convenience's sake, respective items of information captured for a particular sub-event will be referred to in a similar manner (e.g., "D-1," "D-2," etc.) as they were in connection with FIG. 5 and FIG. 6 above.

In the playlist of FIG. 9B, different sub-event entries 94 are arranged horizontally on the user interface 900B. More sub-event entries may be provided outside of the viewport of the user interface 900B. As such, the user may need to the playlist up (e.g., using a swipe motion such as 91B) to place these sub-event entries into the viewport. Although FIG. 9B shows each of the sub-event entries 94 as being labeled with corresponding sub-event identifiers (SE-1, SE-3, SE5), it is not necessary for the sub-event identifiers to be explicitly displayed to the user.

Figure 9C:
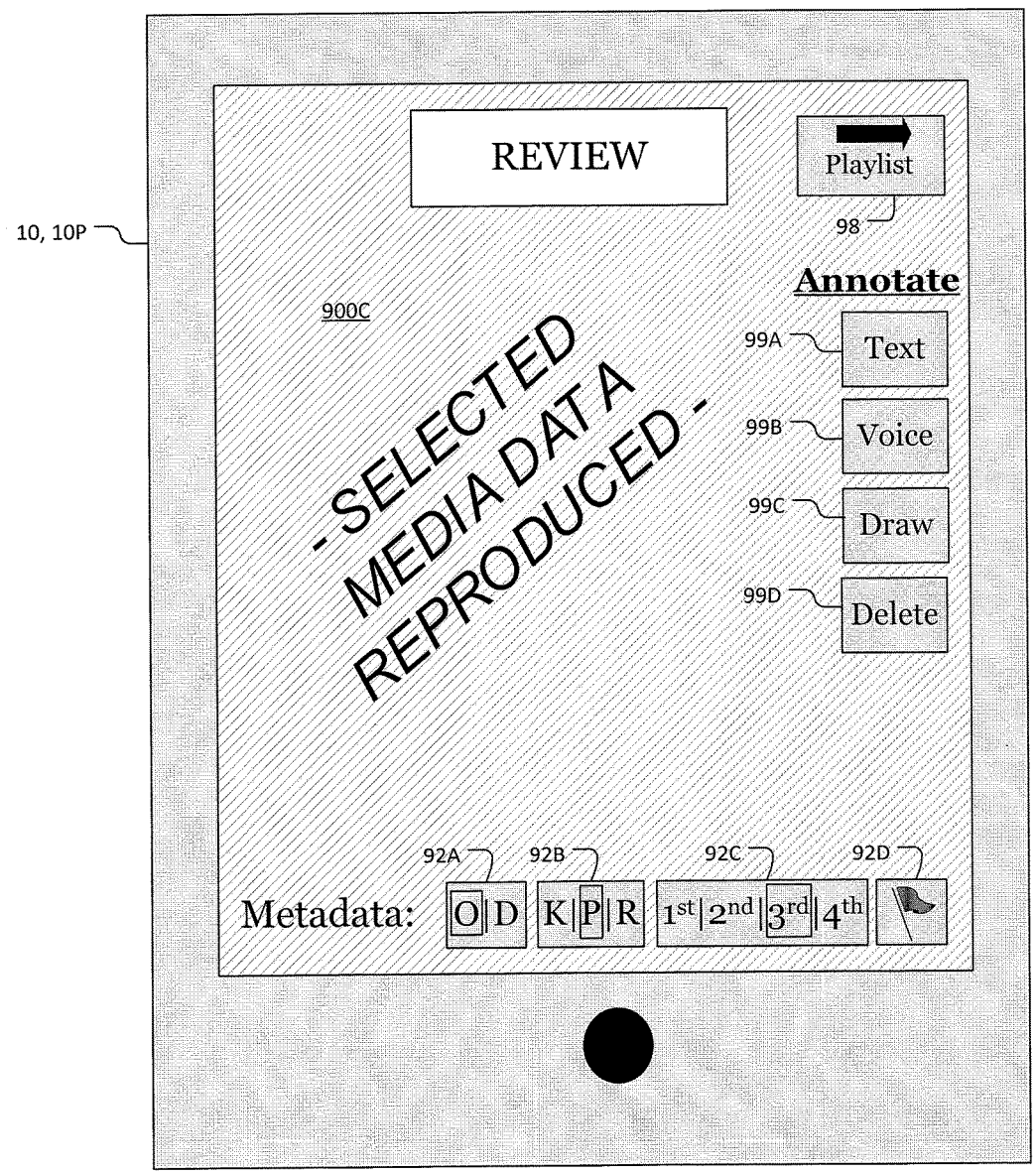

Within a particular sub-event entry 94, a series of selectable graphical elements 95 may be displayed, which represent respective items of information captured for the corresponding sub-event. For instance, when the user selects (e.g., taps) a particular graphical element 95, this may cause the terminal 10, 10P to switch to a "Review" mode, as illustrated in FIG. 9C, in which the corresponding item of information is reproduced on a screen and/or using an audio speaker of the terminal 10, 10P. This Review mode will be described in further detail below in connection with FIG. 9C. Each of these graphical elements 95 may be linked to the corresponding sub-event identifier for the sub-event entry 94 thereby facilitating the retrieval of the corresponding item of information from storage (either from a local storage device, or from a storage location in a remote server (aggregating device 12)). As such, by selecting one of the graphical elements 95, the user is not only selecting a particular item of information but in a broader sense is selecting the corresponding sub-event identifier (even though the user does not need to specifically see or know the sub-event identifier being selected).

Referring again to FIG. 9B, according to one embodiment, the graphical elements 95 may simply be generic symbols or placeholders. In an alternative embodiment, however, each graphical element 95 may include a visual representation of the content or at least the type of information that was captured. For example, if video data or a still image has been captured, the corresponding graphical element 95 may comprise a thumbnail image extracted from the captured video data/still image. Otherwise, the graphical element 95 may symbolically represent the type of information that was captured. E.g., if audio data has been captured, the corresponding graphical element 95 may be a graphical representation of a musical note.

Further, it is contemplated that not all of the graphical elements 95 of a particular sub-event entry 94 may be viewable on the user interface 900B at the same time. As such, it might be necessary for the user to scroll through the graphical elements 95 of a particular sub-event entry 94 in order to see them all. For instance, in the sub-event entry 94 corresponding to sub-event identifier "SE-1" in FIG. 9B, a user might be able to scroll through the graphical elements 95 using a horizontal swiping motion.

Consider, for example, the sub-event entry 94 in FIG. 9B corresponding to sub-event identifier SE-1. Here, the graphical element 95 representing item D-2 is displayed in the foreground, while two other graphical elements 95 representing items D-1 and D-3, respectively, are displayed in the background. The playlist of FIG. 9B may be configured (but does not have to be) so that only a graphical element 95 displayed in the foreground can be selected to be reproduced in Review mode. As such, if the user is interested in moving the graphical element 95 representing item D-3 to the foreground, this could be accomplished with a swiping motion 91A. Further, such a swiping motion might cause another graphical element 95 representing item D-4 into view in the background (i.e., to the right of the graphical element 95 representing item D-3).

Furthermore, as shown in FIG. 9B, the selectable graphical elements 95 of each sub-event entry 94 may be used only to represent items of media data (e.g., video data, audio data, or a still image). As such, the captured metadata of a sub-event may be displayed apart from (e.g., below) the graphical element 95 of corresponding sub-event entry 94, as shown in FIG. 9B. However, the present invention is not limited to such an embodiment. In an alternative embodiment, items of metadata may similarly be represented in a sub-event entry 94 using selectable graphical elements 95.

Moreover, in the Playlist mode, the user interface 900B may allow the user to filter out various sub-event entries 94 based on, e.g., the metadata captured for the sub-events. As such, a filter control 96 may be provided on the user interface 900B which allows the user to select certain types of metadata that must be present within each sub-event represented on the playlist. For instance, using the football game example, FIG. 9B shows the filter control 96 being used to filter the sub-event entries 94 on the playlist to those corresponding to passing plays during the game. Further, FIG. 9B shows that the user could have alternatively filtered the plays on the playlist so that only running plays or kicking plays were presented. Also, it may be possible to allow the user to choose two or more types of metadata to filter the playlist. For instance, the user may be able to choose all passing plays on first down, or all running plays during which a flag was thrown (i.e., penalty called).

As mentioned above, when one of the graphical elements 95 on the playlist is selected, this may cause the terminal 10, 10P to enter a "Review" mode for purpose of reproducing the item of media data (or possibly metadata) represented by the graphical element 95. FIG. 9C illustrates a user interface 900C corresponding to this Review mode. As illustrated in FIG. 9C, the corresponding item of information is reproduced on the screen of the terminal 10, 10P, but this may not always be the case. For instance, if the corresponding item comprises audio data, it may be reproduced audibly using a speaker on the terminal 10, 10P.

Further, the user interface 900C may allow the user to input additional metadata of the sub-event in the Review mode. As such, FIG. 9C shows that various metadata inputting controls may be provided in the user interface 900C. These controls may, e.g., be overlaid on the reproduced item of media data, e.g., if such information constitutes video data or a still image.

For example, the user may be able to annotate the reproduced video data or still image using annotation controls 99A-99D. I.e., the user may be able to annotate the video or still image by inserting text, a voice recording, and/or a drawing according to controls 99A, 99B, and 99C, respectively. Accordingly, whenever the video or still image is reproduced in the future, such annotations may also be reproduced over the video or still image at the locations where they were made by the user. Also, information of the respective timings of the annotations may also be captured. This would make it possible for the annotations to be reproduced on the video or still image in the same sequence and at the same timing as originally inputted by the user. Further, it is also possible to use the annotation controls 99A-99C to annotate audio data as it is being reproduced. Also, in user interface 900C, a "Delete" control 99D may be provided which allows the user to delete unwanted annotations.

Moreover, metadata controls 92A-92D may be provided on the user interface 900C, similar to those provided on user interface 900A (corresponding to "Data Capture" mode). This would allow the user to input metadata on the basis of the reproduced media data, e.g., to add some observations that might have been missed while the sub-event was taking place.

It has been described above that at least one of the terminals 10, 10P in a system 1 may be configured to provide a user the functionality of capturing one or more types of media data of a particular sub-event such as video data, audio data, and/or still images. It has also been described that such a terminal 10, 10P may also be configured to provide the user with the added functionality of capturing metadata describing such sub-event. However, according to a further exemplary embodiment, at least one of the terminals 10, 10P may further provide the user with the functionality to "live code" any video and/or audio data that is currently being captured by the terminal 10, 10P. Particularly, the user may be allowed to live code such video and/or audio data by annotating it in real-time. Or else, the terminal 10, 10P may be used to live code the video and/or audio data by asynchronously capturing and transmitting other types of information (e.g., metadata and/or still images), in real-time, while the video and/or audio data is being captured.

Moreover, such a terminal 10, 10P may be configured to stream the video and/or audio data, while it is being captured, to other devices (e.g., to an aggregating device 12 and/or to other terminals 10, 10P). This would provide a user with the capability to live code streaming data in real-time.

Furthermore, it is contemplated that a primary terminal 10P may be configured with the aforementioned streaming and live coding functionalities. Moreover, the user instruction which causes the primary terminal 10P to start capturing the video and/or audio data, may be the same user instruction which indicates to the primary terminal 10P the start of a particular sub-event.

Reference will now be made to FIG. 7 which is a flowchart illustrating operations of a process 700 whereby a terminal 10, 10P may perform live coding of streaming data. According to operation S710, the terminal 10, 10P receives an instruction to start capture of the video and/or audio data.

This instruction may be received via control 90A and/or 90B of a user interface 900A which is presented on the terminal 10 during a "Data Capture" mode (as discussed above in connection with FIG. 9A). In response to this instruction, the terminal 10, 10P may start capturing and streaming the video and/or audio data according to operation S720. For instance, if the terminal 10, 10P is part of a cloud-based system 1A (as illustrated in FIG. 2A), the terminal 10, 10P may stream the video and/or audio data to a cloud server. Alternatively, in a P2P system 1B (as illustrated in FIG. 2B), the terminal 10, 10P may stream the video and/or audio data directly to other terminals 10, 10P via P2P connections.

Figure 9D:
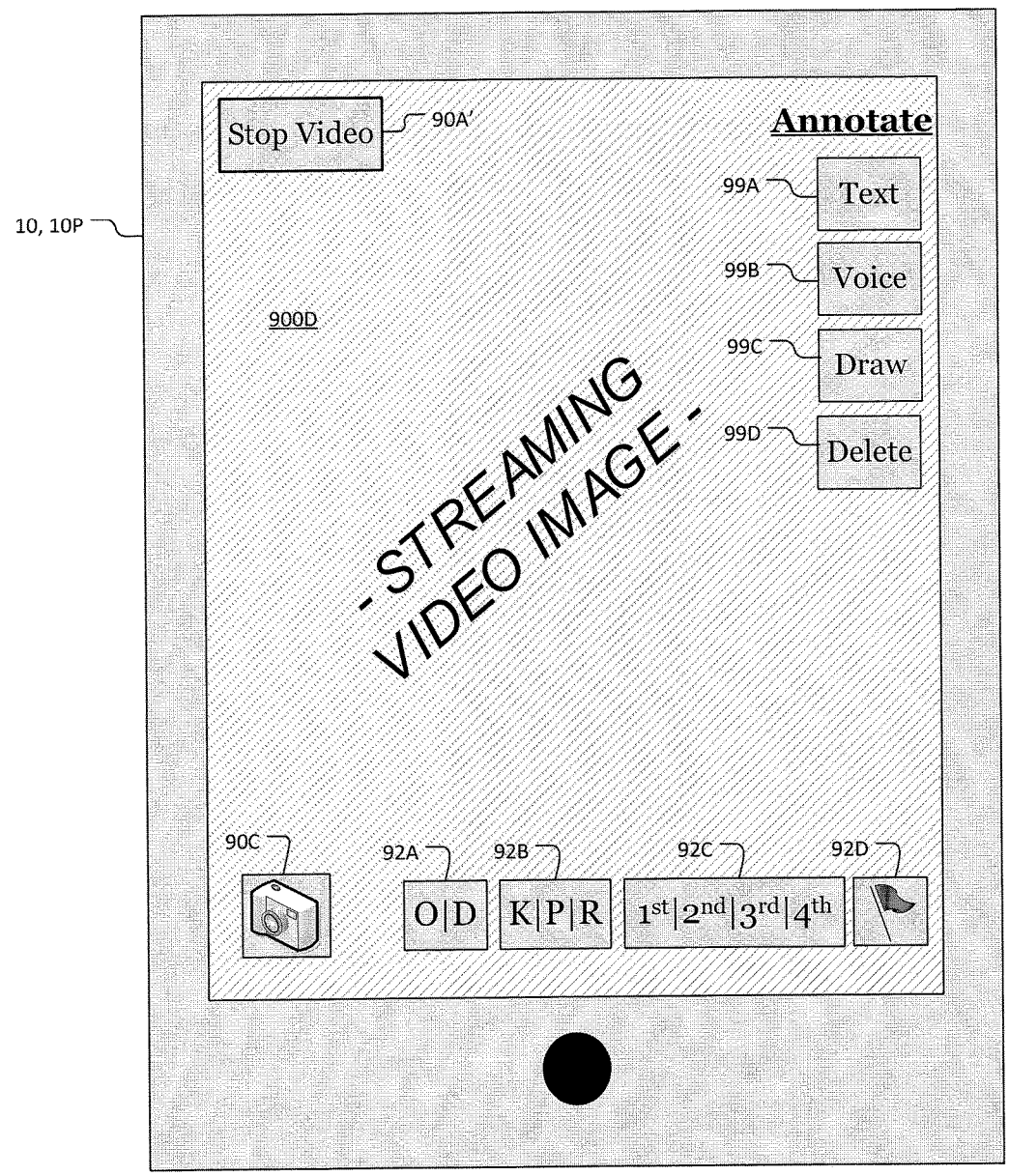

While video and/or audio data is being captured and streamed according to S720, the user may be given the option to perform live coding, e.g., via the terminal's 10, 10P user interface. Particularly, FIG. 9D illustrates a user interface 900D for providing live coding functionality. (Although FIG. 9D is drawn to a particular example in which video data is being streamed, the user interface 900D can easily be modified for situations where audio data is streamed.) In user interface 900D, annotation controls 99A-99D are provided, similar to those described above in connection with the user interface 900C of FIG. 9C. With these controls 99A-99D, the user interface 900D may allow the user to annotate streaming video data with text, a voice recording, and/or drawings. As such, when the video is later reproduced, the annotations may also be reproduced over the video at the locations where they were originally inputted. Also, timing information of the annotations may be captured, thus making it possible for the annotations to be reproduced in the same sequence and at the same timing as originally inputted. (It should be noted that the controls 99A-99D may also be used to annotate streaming audio data too.)

Furthermore, the user interface 900D of FIG. 9D includes a control 90C which allows the user to asynchronously capture a still image while the video and/or audio data is streaming, along with controls 92A-92D which allow the user to input other types of metadata (as described above in connection with the user interface 900A of FIG. 9A).

Also, the user interface 900D of FIG. 9D provides a control 90A' whereby the user can instruct the terminal 10, 10P to stop the capture and streaming of video data. Although not shown, a similar type of control may be provided on the user interface 900D whereby the user can likewise instruct the terminal 10, 10P to stop the capture and streaming of audio data.

Referring again to FIG. 7, according to operation S740, the terminal 10, 10P monitors whether it has received an instruction to perform live coding. Such instruction may be inputted as annotations to the video and/or audio data while it is being captured and streamed. Alternatively, the user may simply input a command to capture metadata or a still image while the audio and/or video data is being captured and streamed. When such a live coding instruction is received ("YES" decision in S740), operations S750-S770 are performed in real-time. According to operation S750, the annotations, metadata, or still image is captured and recorded. This data may be associated with an appropriate sub-event identifier according to operation S760, and then transmitted (e.g., to a server or directly to other terminals 10, 10P) in accordance with operation S770. After information (annotation, metadata or still image) is captured according to S750-S770, as the streaming of data continues according to S720, the terminal 10, 10P may continue to monitor for other live coding instructions (thus process 700 returns to S740) until an instruction is received to stop the capture and streaming of S720 (e.g., via control 90A' or the like).

Figure 8:
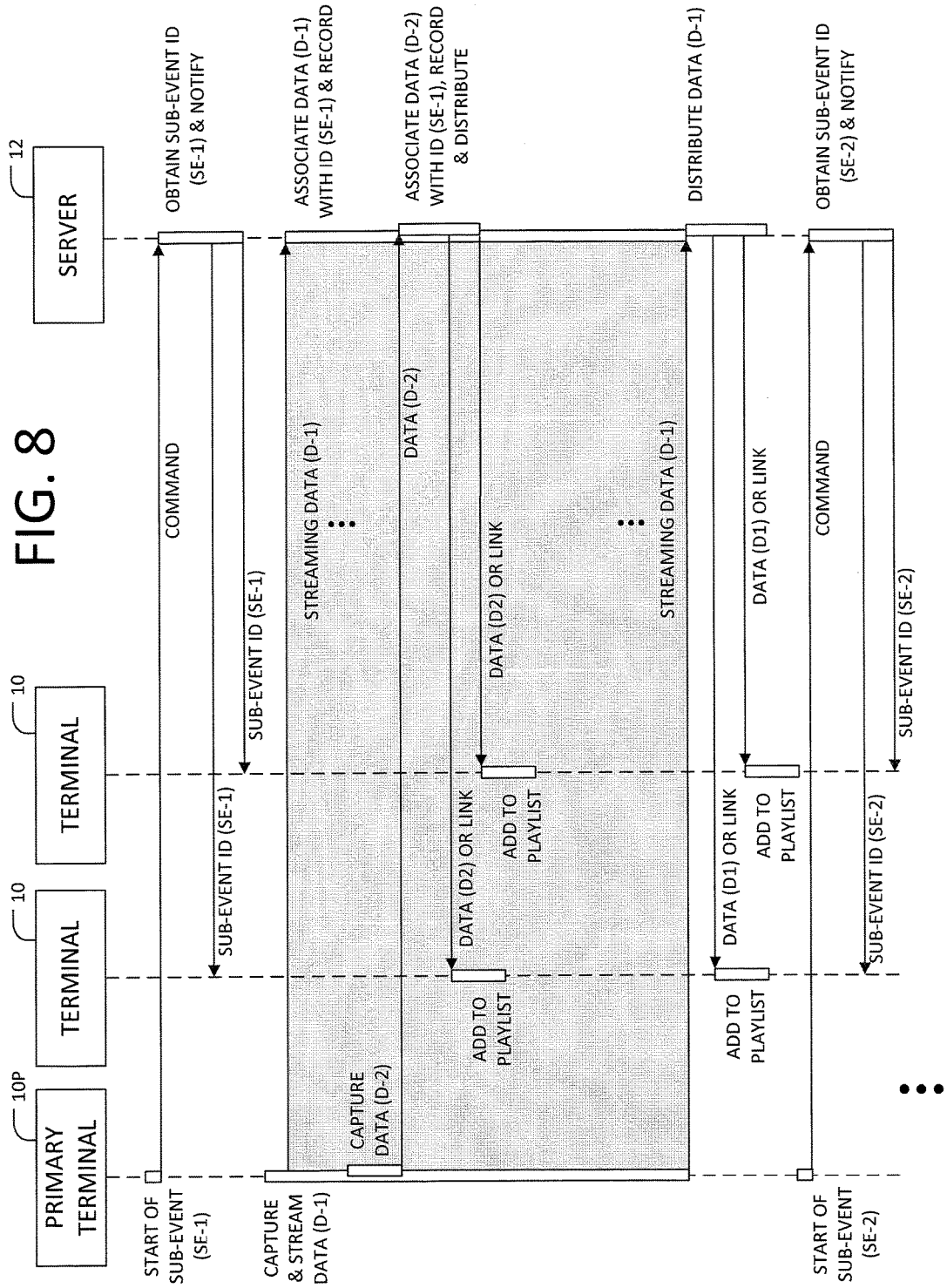
FIG. 8 is a diagram illustrating an example of data flow including live coding of streaming data according to an exemplary embodiment.

Reference will now be made to FIG. 8, which is a data flow diagram illustrating an example in which a primary terminal 10P is implemented with the aforementioned live coding functionality. Although FIG. 8 illustrates a particular example involving a cloud-based system 1A, this is not meant to limit the implementation of live coding functionality to a cloud-based embodiment. Live coding functionality may also be utilized in connection with a P2P-based system 1B.

As shown in FIG. 8, when the primary terminal 10P is instructed of the start of an initial sub-event, it transmits a command to notify the server of the start of the sub-event. In response, the server notifies the other terminals 10 of the start of the sub-event. Thereafter, the primary terminal 10P is instructed to capture and stream data (D-1) to the server. This data (D-1) may comprise video and/or audio data. Further, as streaming of the data (D-1) is initiated, the server may associate the data with the appropriate sub-event identifier for purposes of recording it in the database.

While the data (D-1) is captured and streamed to the server, the primary terminal 10P receives another instruction to capture another type of data (D-2). In the particular example of FIG. 8, data (D-2) is illustrated as asynchronously captured information, e.g., a still image or metadata.

Accordingly, while data (D-1) is being streamed, the following operations may be performed in real-time:
the primary terminal 10P captures and records data (D-2), and transmits it to the server;
the server associates the received data (D-2) with the appropriate sub-event identifier, records in the database, and transmits it (or a corresponding link) to the other terminals 10
the other terminals 10 receive the data (D-2) or link, and add it to their respective playlists.

After the user instructs the primary terminal 10P to stop the capture of the streaming data (D-1), the server distributes such data (D-1) or a corresponding link to each of the terminals 10 in real-time. Accordingly, the data (D-1) or the link can be added to the respective playlists in real-time.

While particular embodiments have been described above for purposes of example, they are not intended to be limiting on the present invention whose metes and bounds have been defined in the accompanying claims.

The invention claimed is:
1. A system for asynchronously collecting information of an event in real-time, at least a portion of said event being organized as a series of sub-events, said system comprising:
a plurality of terminals situated at a venue of the event, each of said plurality of terminals being a processor-based device, said plurality of terminals including multiple terminals configured to capture information pertaining to one or more of the sub-events;
a server configured to aggregate said captured information according to said sub-events; and
a data network communicatively connecting said plurality of terminals and said server,
wherein one of said plurality of terminals is configured to be a primary terminal that transmits a particular command via the data network to notify said server in real-time of a start of a particular sub-event, such that said particular command either
includes a particular sub-event identifier created by said primary terminal in real-time in response to the start of the particular sub-event, or causes said server to create a particular sub-event identifier in real-time in response to being notified of the start of the particular sub-event, wherein said server is programmed to record multiple items of said information, which are captured by respective said multiple terminals during said particular sub-event, in association with said particular sub-event identifier, wherein said primary terminal is configured to transmit a new command via the data network to notify said server of a start of a new sub-event, such that said new command either includes a new sub-event identifier being created by said primary terminal in real-time in response to said start of said new sub-event, or causes said server to create a new sub-event identifier in real-time in response to being notified of the start of the new sub-event, and wherein said server is programmed to record each item of information captured by respective said multiple terminals during said new sub-event in association with said new sub-event identifier, wherein a playlist is displayed at each of said plurality of terminals, said playlist including a plurality of the sub-events wherein each of the sub-events in the playlist includes one or more items of information captured by respective said multiple terminals, said playlist being organized so that each of said one or more items of information included in each of the sub-events in said playlist is selectable by a user, and wherein, whenever a new item of information is captured by one of said multiple terminals, said server transmits said new item of information or a link to said new item of information to each of the other terminals in real-time to be added to the corresponding sub-event in the playlist.

2. The system according to claim 1, wherein the event is a football game, and the sub-events are plays from scrimmage.

3. A system for asynchronously collecting information of an event in real-time, at least a portion of said event being organized as a series of sub-events, said system comprising:

a plurality of terminals situated at a venue of the event, each of said plurality of terminals being a processor-based device, said plurality of terminals including multiple terminals configured to capture information pertaining to one or more of the sub-events; and a data network communicatively connecting said plurality of terminals, wherein one of said plurality of terminals is configured to be a primary terminal that transmits a particular command via the data network to notify one or more other terminals of said plurality of terminals, in real-time, of a start of a particular sub-event, said sub-event being associated with a particular sub-event identifier, wherein at least one terminal of said plurality of terminals is programmed to record multiple items of said information, which are captured by respective said multiple terminals during said particular sub-event, in association with said particular sub-event identifier, wherein said primary terminal is configured to transmit a new command via the data network to notify said one or more other terminals of a start of a new sub-event, said new sub-event being associated with a new sub-event identifier, wherein said at least one terminal is programmed to record any item of information captured during said new sub-event in association with said new sub-event identifier, wherein a playlist is displayed at each of said plurality of terminals, said playlist including a plurality of the sub-events wherein each of the sub-events in the playlist includes one or more items of information captured by respective said multiple terminals, said playlist being organized so that each of said one or more items of information included in each of the sub-events in said playlist is selectable by a user, and wherein, whenever a new item of information is captured by one of said multiple terminals, said new item of information or a link to said new item of information is transmitted to each of the other terminals in real-time to be added to the corresponding sub-event in the playlist.

4. The system according to claim 3, wherein each of said plurality of terminals transmits in real-time each item of information captured and stored therein during respective said sub-events to the others of said plurality of terminals.

5. The system according to claim 1, wherein said information captured by respective said multiple terminals, during said particular sub-event, includes:

metadata, and at least one of video data and a still-image, and wherein said metadata and said at least one of video data and still-image data are captured asynchronously during said particular sub-event.

6. The system according to claim 5, wherein said primary terminal is configured to receive a start instruction inputted by a user, and transmit said command notifying of said start of said duration of said particular sub-event in real-time in accordance with the inputting of said start instruction by said user.

7. The system according to claim 6, wherein said primary terminal is a mobile phone, a tablet computer, or a laptop computer.

8. The system according to claim 6, wherein at least one of said multiple terminals streams said captured video data to said server, and further provides live coding functionality allowing said user to asynchronously input metadata associated with said particular sub-event while said video data is streaming, said inputted metadata being transmitted in real-time to said server.

9. The system according to claim 8, wherein said live coding functionality further allows said user to asynchronously capture still-image data while said video data is streaming, said still-image data being transmitted in real-time to said server.

10. The system according to claim 3, wherein at least one of said multiple items of information captured by said multiple terminals during respective said sub-events includes:

metadata, and at least one of video data and a still-image, and wherein said metadata and said at least one of video data and still-image data are captured asynchronously.

11. The system according to claim 10, wherein said primary terminal is configured to receive a start instruction inputted by a user, and transmit said command notifying of said start of said duration of said particular sub-event in real-time in accordance with the inputting of said start instruction by said user.

12. A terminal situated at a venue of an event, at least a portion of said event being organized as a series of sub-events, said terminal being one of multiple terminals communicatively connected to a server by a data network, said terminal comprising:
  a video capture device;
  a display screen; and
  a processor programmed to:
    provide a user interface via said display screen whereby a user can input an instruction to capture video data via said video capture device, and input metadata pertaining to one or more of the sub-events, said metadata being inputted asynchronously with said instruction to capture said video data;
    in response to said user inputting the instruction to capture said video data, perform the following in real-time:
      transmit a command via said data network to notify said server of the start of a particular sub-event,
      obtain a sub-event identifier corresponding to said particular sub-event,
      control said video capture device to capture video data of said particular sub-event, said captured video data being streamed to said server in real-time while being captured, said captured video data further being recorded in association with said particular sub-event by virtue of said sub-event identifier, and
      provide live coding functionality whereby any metadata, which is inputted by a user via said user interface while said video data is streaming, is transmitted to said server and recorded as metadata of said particular sub-event,
  wherein said processor is programmed to transmit a new command via the data network to notify said server of the start of a new sub-event, and obtain a new sub-event identifier corresponding to said new sub-event,
  wherein a playlist is displayed on said display screen, said playlist including a plurality of the sub-events wherein each of the sub-events in the playlist includes one or more items of information captured by respective said multiple terminals, said playlist being organized so that each of said one or more items of information included in each of the sub-events in said playlist is selectable by a user, and
  wherein, whenever a new item of information is captured by one of said multiple terminals, said server transmits said new item of information or a link to said new item of information to each of the other terminals in real-time to be added to the corresponding sub-event in the playlist.

13. The terminal according to claim 12, wherein others of said multiple terminals are situated at said venue and capable of capturing information of respective said sub-events.

14. The terminal according to claim 12, further comprising a still-image capture device, wherein
  said user interface is operable by said user to input an instruction to capture a still image pertaining to said event, and
  said live coding functionality is operable so that, if said instruction to capture said still image is inputted during said particular sub-event, said still-image capture device asynchronously captures said still image while said video data is streaming, said captured still image being transmitted to said other processor-based device and recorded in association with said particular sub-event.

15. The terminal according to claim 12, wherein said terminal is a mobile phone, a tablet computer, or a laptop computer.

16. A computer system configured as a server communicatively connected via a network to a plurality of processor-based terminals situated at a venue of an event, at least a portion of said event being organized as a series of sub-events, said computer system comprising:
  a data storage; and
  a processor programmed to perform the following in real-time:
    receive a particular command transmitted by said primary terminal to notifying of a start of a particular sub-event;
    either receive a particular sub-event identifier included in said particular command, or create said particular sub-event identifier in real-time in response to be notified of the start of the particular sub-event;
    receive multiple items of information captured during said particular sub-event and transmitted by respective terminals of said plurality of processor-based terminals;
    record said multiple items of information captured during said particular sub-event in association with said particular sub-event identifier;
    transmit data to each of said plurality of processor-based terminals causing each of the plurality of processor-based terminals to add each of said multiple items of said captured information to playlists respectively displayed by said plurality of processor-based terminals in association with said particular sub-event identifier;
    receive a new command notifying of a start of a new sub-event;
    either receive a new sub-event identifier included in said new command, or create said new sub-event identifier in real-time in response to be notified of the start of the new sub-event;
    record any item of information captured during said new sub-event such that said any item of information is recorded in said server in association with said new sub-event identifier; and
    transmit data to each of said plurality of processor-based terminals causing each of the plurality of processor-based terminals to add said any item of information to the playlists respectively displayed by said plurality of processor-based terminals in association with said new sub-event identifier,
  wherein the playlist displayed at each of said plurality of processor-based terminals includes a plurality of the sub-events wherein each of the sub-events in the playlist includes one or more items of information captured by respective said plurality of processor-based terminals, said playlist being organized so that each of said one or more items of information included in each of the sub-events in said playlist is selectable by a user, and
  wherein, whenever a new item of information is captured by one of said plurality of processor-based terminals, said server transmits said new item of information or a link to said new item of information to each of the other processor-based terminals in real-time to be added to the corresponding sub-event in the playlist.

17. A method implemented by a terminal situated at a venue of an event, at least a portion of said event being organized as a series of sub-events, said terminal including a video capture device and a display screen, said terminal being one of multiple terminals communicatively connected to each other by a data network, said method comprising:

utilizing a processor in the terminal device to execute a process of:

providing a user interface via said display screen whereby a user can input an instruction to capture video data via said video capture device, and input metadata pertaining to one or more of the sub-events, said metadata being inputted asynchronously with said instruction to capture said video data;

in response to said user inputting the instruction to capture said video data, performing the following in real-time:

transmitting a command via said data network to notify one or more other terminals of said multiple terminals of the start of a particular sub-event, obtaining a sub-event identifier corresponding to said particular sub-event, controlling said video capture device to capture video data of said particular sub-event, said captured video data further being recorded by the terminal in association with said particular sub-event by virtue of said sub-event identifier, and providing live coding functionality whereby metadata, which is inputted by a user via said user interface while said video data is being captured, is recorded as metadata of said particular sub-event to be reproduced on said video data in a same sequence and at a same timing as inputted by said user, wherein said method further comprises utilizing said processor to transmit a new command via the data network to notify said one or more terminals of the start of a new sub-event, and obtain a new sub-event identifier corresponding to said new sub-event, wherein said method further comprises displaying a playlist on said display screen, said playlist including a plurality of the sub-events wherein each of the sub-events in the playlist includes one or more items of information captured by respective said multiple terminals, said playlist being organized so that each of said one or more items of information included in each of the sub-events in said playlist is selectable by a user, and wherein, whenever a new item of information is captured by one of said plurality of terminals, said new item of information or a link to said new item of information is transmitted to each of the other terminals in real-time to be added to the corresponding sub-event in the playlist.

18. The method according to claim 17, wherein others of said multiple terminals are situated at said venue and capable of capturing information of respective said sub-events.

19. The method according to claim 17, wherein said terminal includes a still-image capture device, and said process further comprises:

receiving an instruction inputted via said user interface to capture a still image pertaining to said event, and if said instruction to capture said still image is inputted during said particular sub-event, asynchronously capturing said still image with said still-image capture device while said video data is streaming, and transmitting said captured still image to said other processor-based device.

\* \* \* \* \*